US012576595B2

(12) United States Patent
McLeod et al.

(10) Patent No.: US 12,576,595 B2
(45) Date of Patent: Mar. 17, 2026

(54) SYSTEMS AND METHODS FOR IMPROVED VOLUMETRIC ADDITIVE MANUFACTURING

(71) Applicant: THE REGENTS OF THE UNIVERSITY OF COLORADO, A BODY CORPORATE, Denver, CO (US)

(72) Inventors: Robert R. McLeod, Boulder, CO (US); Charles M. Rackson, Boulder, CO (US)

(73) Assignee: The Regents of the University of Colorado, a Body Corporate, Denver, CO (US)

( * ) Notice: Subject to any disclaimer, the term of this patent is extended or adjusted under 35 U.S.C. 154(b) by 140 days.

(21) Appl. No.: 18/288,713

(22) PCT Filed: Apr. 28, 2022

(86) PCT No.: PCT/US2022/026728
§ 371 (c)(1),
(2) Date: Oct. 27, 2023

(87) PCT Pub. No.: WO2022/232390
PCT Pub. Date: Nov. 3, 2022

(65) Prior Publication Data
US 2024/0217180 A1 Jul. 4, 2024

Related U.S. Application Data

(60) Provisional application No. 63/181,645, filed on Apr. 29, 2021.

(51) Int. Cl.
B29C 64/393 (2017.01)
A61C 7/08 (2006.01)
(Continued)

(52) U.S. Cl.
CPC .............. *B29C 64/393* (2017.08); *A61C 7/08* (2013.01); *B29C 64/124* (2017.08);
(Continued)

(58) Field of Classification Search
CPC ... B29C 64/393; B29C 64/124; B29C 64/241; B29C 64/10; A61C 7/08; B33Y 10/00;
(Continued)

(56) References Cited

U.S. PATENT DOCUMENTS

| | | | | |
|---|---|---|---|---|
| 11,993,017 B2 * | 5/2024 | Delrot | .................... | B33Y 10/00 |
| 2020/0361152 A1 * | 11/2020 | Shusteff | ................ | B29C 64/153 |

(Continued)

FOREIGN PATENT DOCUMENTS

| | | | | |
|---|---|---|---|---|
| WO | WO-2020064779 A1 * | 4/2020 | ........... | B29C 64/135 |

*Primary Examiner* — Amara Abdi
(74) *Attorney, Agent, or Firm* — Osha Bergman Watanabe & Burton LLP

(57) ABSTRACT

Systems and methods for improved volumetric additive manufacturing (VAM) are described herein. In some aspects of the present disclosure, approaches to VAM image-computation are provided that algebraically optimizes directly on the structure to be printed, instead of on the set of external projection images. These approaches provide multiple advantages including improved reconstruction fidelity, simplicity, flexibility, and robust convergence to a desirable reconstruction, regardless of initial image-set guess.

10 Claims, 12 Drawing Sheets

(51) Int. Cl.

| | |
|---|---|
| *B29C 64/124* | (2017.01) |
| *B29C 64/241* | (2017.01) |
| *B33Y 10/00* | (2015.01) |
| *B33Y 30/00* | (2015.01) |
| *B33Y 50/02* | (2015.01) |
| *B33Y 80/00* | (2015.01) |
| B29L 31/00 | (2006.01) |

(52) U.S. Cl.
CPC ............ *B29C 64/241* (2017.08); *B33Y 10/00* (2014.12); *B33Y 30/00* (2014.12); *B33Y 50/02* (2014.12); *B33Y 80/00* (2014.12); *B29L 2031/753* (2013.01)

(58) Field of Classification Search
CPC ......... B33Y 30/00; B33Y 50/02; B33Y 80/00; B29L 2031/753
See application file for complete search history.

(56) References Cited

U.S. PATENT DOCUMENTS

| | | | | |
|---|---|---|---|---|
| 2021/0016496 | A1* | 1/2021 | Chen ................ | B29D 11/00019 |
| 2021/0379819 | A1* | 12/2021 | Delrot ................... | B29C 64/124 |
| 2021/0394449 | A1* | 12/2021 | Kostenko ................. | G06T 7/62 |
| 2022/0001601 | A1* | 1/2022 | Fang .................... | B29C 64/232 |

* cited by examiner

FIG. 6

SYSTEMS AND METHODS FOR IMPROVED VOLUMETRIC ADDITIVE MANUFACTURING

CROSS-REFERENCE TO RELATED APPLICATIONS

This application is a 35 U.S.C. § 371 national phase application from, and claims priority to, International Application No. PCT/US2022/026728, filed Apr. 28, 2022, which claims priority under 35 U.S.C. § 119 (e) to U.S. Patent Provisional Application No. 63/181,645 entitled "SYSTEMS AND METHODS FOR IMPROVED VOLUMETRIC ADDITIVE MANUFACTURING", filed Apr. 29, 2021, all of which applications are incorporated by reference herein in their entireties.

STATEMENT REGARDING FEDERALLY SPONSORED RESEARCH

This invention was made with government support under grant number 1826454, awarded by the National Science Foundation: grant number 07NA27344, awarded by the U.S. Department of Energy: and grant numbers D023852-01 and NS118188 awarded by the National Institutes of Health. The government has certain rights in the invention.

BACKGROUND

Multi-step additive manufacturing (AM) is being pursued for many diverse applications like, e.g: rapid prototyping, orthodontics, automotive parts, regenerative medicine, and so forth. However, multistep printing processes have some inherent challenges. From extrusion-based techniques to stereolithographic printing, multistep printing processes struggle with three main challenges. First, structures must be connected and supported. Second, fresh printing-material must be transported to the printed part during the print. Third, printed parts suffer from layering effects. The first challenge has been addressed by a variety of approaches, but these approaches present additional steps that slow down printing, and the final part-options are ultimately still limited. The second challenge not only limits print-speed, but limits the resins that can be used for printing: e.g. printing cannot be done into solids, and the mechanical properties of parts are ultimately limited by the viscosity of the printing-resins. The third challenge is tolerable for some applications, but for others (e.g. printing optics, or uniform-in-modulus parts), it can cause inhomogeneities in material properties (e.g. refractive index, modulus, chemical functionality, and so forth) that limit its applications, and it is a problem that the field of AM is still working to solve.

The relatively new field of Volumetric Additive Manufacturing (VAM) performs printing directly into a 3D resin volume, avoiding the sequential processing steps currently in use. In VAM printing, a series of 2D optical patterns is projected into a rotating volume of photosensitive liquid resin (FIG. 1). Over the course of tens of seconds to a few minutes, the accumulated optical dose distribution polymerizes the material, resulting in an arbitrary 3D structure, and the printed part is removed from the remaining liquid resin.

VAM is free of many of the constraints inherent to multi-step AM. Most notably, layering effects are eliminated, non-contiguous parts become possible, and the lack of material-movement mid-print enables high-viscosity resins, with no penalty to print-time, opening the doors to a host of new material properties. However, there remain challenges to solve in the field of VAM.

VAM is enabled by a combination of mathematics, optics, and material science. While significant progress has been reported on optics and materials, there is a lack of analysis in the literature about the inverse math problem of computing the images that, when projected into resin, integrate together to print a part.

The typical goal of 3D polymeric printing generally, and VAM specifically, is to fabricate a 3D part in which voxels receive local optical dose to be either above or below the gelation threshold of the resin (e.g., known as Binary VAM printing). One VAM printing geometry, in which images are projected orthogonally to the resin's axis of rotation (FIG. 1A), can be considered as a collection of independent 2D reconstruction problems. For each horizontal 2D slice-region in the resin (e.g. shown as the shaded slice in FIG. 1A), the computational problem is to choose the set of 1D projected images that integrate together to exceed a dose-to-gelation threshold for in-part voxels, while remaining below this threshold for out-of-part voxels, thus printing a desired geometry (FIGS. 1B and 1C).

This computational problem has solutions necessarily involving various compromises, because the images are constrained to be non-negative in intensity. This constraint precludes the direct application of the well-known Filtered Back Projection (FBP) algorithm, which provides an invertible one-to-one transformation between the set of images and the integrated volumetric dose, since FBP produces images with negative intensity. Any non-negative image-set solution, therefore, can only approximate an ideal dose-distribution (e.g., since a one-to-one solution is inapplicable), and must rely on a material non-linearity, like a gelation threshold, to convert a non-ideal optical dose to an ideal printed shape.

Previously approaches of computing image-sets for Binary VAM employ gradient-descent methods, using an optimizer to adjust image-sets in an attempt to improve the volumetric dose reconstruction. While these methods do, in fact, improve the outcome, they leave room for improvement in multiple ways. First, pertaining to print fidelity, and especially for complex prints, the ability to gel all of the in-part regions while gelling none of the out-of-part regions can be improved. Second, gradient-descent methods require defining a cost function to relate the image-set and object-reconstruction domains. This function, in comparing target-geometry and reconstruction, must remain differentiable, which makes adding reconstruction constrains, changing optical projection models or printing geometries, or modeling material effects a laborious process. Third, prior methods involve parameters that must be manually tuned depending on the particular structure to be printed to achieve good print-fidelity. This process is time-consuming, especially since many optimization iterations must be run to check each new choice of parameter values. While this may be tolerable for some research applications, efforts to extend the capabilities of VAM to efficiently print a given arbitrary structure would be aided by simple algorithms requiring minimal manual adjustment.

SUMMARY

Systems and methods for improved volumetric additive manufacturing (VAM) are described herein. In some aspects of the present disclosure, approaches to VAM image-computation are provided that algebraically optimizes directly on the structure to be printed, instead of on the set of external projection images. These approaches provide multiple advantages including improved reconstruction fidelity, simplicity, flexibility, and robust convergence to a desirable reconstruction, regardless of initial image-set guess. These approaches also naturally allow for the application of object-space constraints such as dose-limits, as well as the application of object-space physical models, such as resin oxygen inhibition, optical refraction, Gaussian beam models, and occlusions for over-printing applications.

These object-optimization approaches are further demonstrated in the present disclosure by computing images for VAM modalities that do not yet exist in the field, but that could enable new applications of VAM. This includes new printing geometries that would enable printing into new sample packages, such as between flat slabs which are addressed through a flat window. This can also include addressing the problem of printing arbitrary functionally graded materials by controlling the degree of polymeric conversion—not just the state of gelation—throughout a printed part, a problem that is referred to as Grayscale VAM.

BRIEF DESCRIPTION OF THE DRAWINGS

For a fuller understanding of the nature and desired objects of the present disclosure, reference is made to the following detailed description taken in conjunction with the accompanying drawing figures wherein like reference characters denote corresponding parts throughout the several views.

FIG. 6 depicts grayscale tomographic reconstructions by non-negative projection sets. Top-Left image: A target dose to reconstruct. Top-Middle image: A model, M, formed by frequency-filtering the target. Top-Right image: the reconstruction yielded from the model. Bottom Row images: reconstructions yielded by adding a constant to the model. The more the model is positively shifted, the higher the values that reconstruct the object in the necessarily reduced-contrast reconstructions, and the more uniform the reconstructed regions of constant target dose.

Algorithms disclosed herein for printing with restricted angular range, around internal opaque inclusions, or from angles out of the plane are particularly appropriate in this case. Fluid injection and removal ports are provided in the package to insert resin, solvents or other chemicals that enable the printing process. The right figure shows an example support structure and composite printing in which a structural element is placed in the print volume before printing such that the structural element is embedded in the final printed object. Supports are provided that position a permanent structure that will be incorporated into the printed part. These supports can be degraded after printing by mechanical means (e.g. abrasion), thermally or by chemical stimulus such as a solvent wash. The supports can help register the part during printing and later metrology and/or precisely position permanent inclusions as shown.

Figure 11:
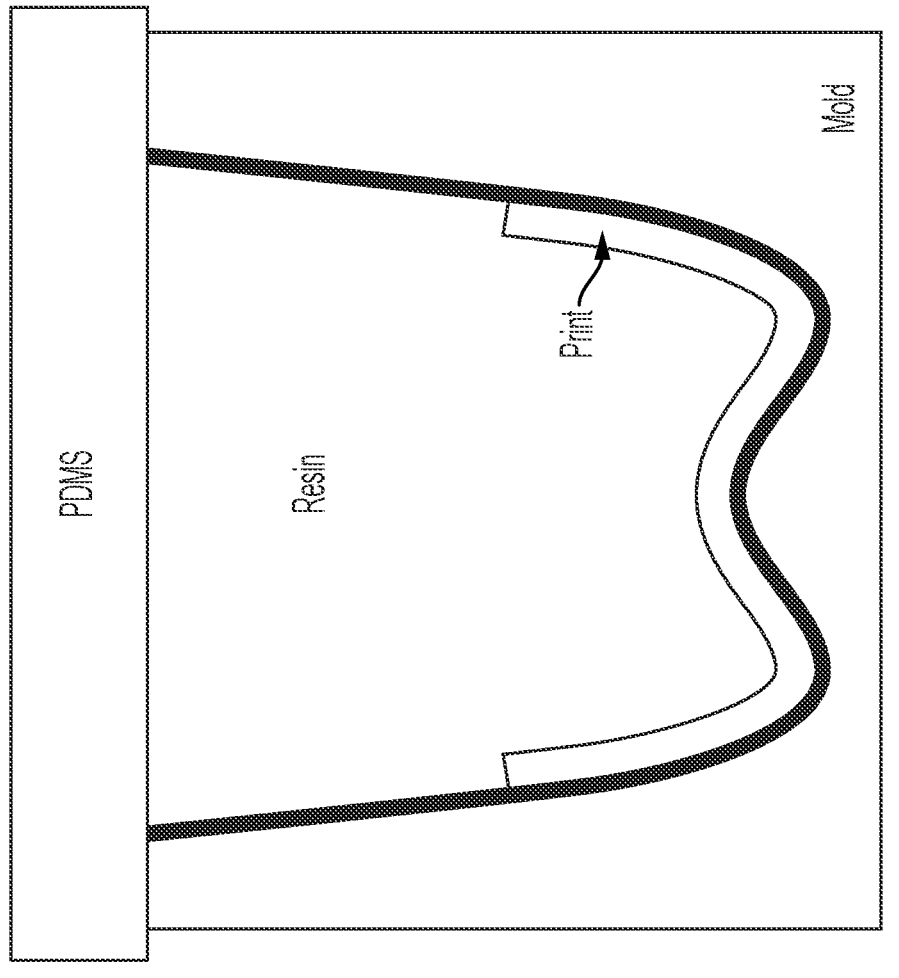

FIG. 11 depicts an example layout of second concept in which the exterior of the aligner is itself used as the package. The molded portion of the aligner would be supplemented with a "lid" here shown as flexible PDMS, to provide a closed container for printable resin or later solvents. Upon completion, the "lid" is removed, leaving a finished aligner with a molded exterior and a custom 3D printed interior that interfaces to the patient's teeth.

DEFINITIONS

The instant disclosure is most clearly understood with reference to the following definitions.

As used herein, the singular form "a," "an," and "the" include plural references unless the context clearly dictates otherwise.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.5%, or 0.01% of the stated value. Unless otherwise clear from context, all numerical values provided herein are modified by the term about.

As used in the specification and claims, the terms "comprises," "comprising," "containing," "having," and the like can have the meaning ascribed to them in U.S. patent law and can mean "includes," "including," and the like.

Unless specifically stated or obvious from context, the term "or," as used herein, is understood to be inclusive.

Ranges provided herein are understood to be shorthand for all of the values within the range. For example, a range of 1 to 50 is understood to include any number, combination of numbers, or sub-range from the group consisting 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 (as well as fractions thereof unless the context clearly dictates otherwise).

The term "photosensitive" as used herein refers to a material that undergoes a chemical reaction upon exposure to electromagnetic radiation, such as ultraviolet, visible, or infrared light.

The term "non-flat surface" as used herein refers to a surface that is curved or that has curvature. The non-flat surface can be, for example, the surface, such as the surface of the longest side of a cylindrical container (e.g. a quartz vial). The curved surface can be spherical, elliptical, or an irregular curvature that is not defined by a single geometric shape.

DETAILED DESCRIPTION

Computation for Binary VAM Printing

An algebraic object-space optimization algorithm for computing image sets to 3D-print arbitrary structures in gel-threshold resins is described herein. The algorithm is simple, flexible, and high-performing compared to previously published alternatives, and has only two simple parameters that directly tune reconstruction properties in object-space. The algorithm is described, the reconstruction quality metrics are defined and described, and consideration for how to choose the two constraint parameters to achieve a desired balance of reconstruction quality metrics are discussed.

Method of Generating Images

In various embodiments, a method for generating images for use in volume additive manufacturing (VAM) is provided. In certain embodiments, the method includes a) selecting, as an initial model, a target distribution of gelation in a volume of photosensitive composition. In certain embodiments, the method includes b) forward projecting the initial model by: generating a set of images at varying angles and positions with respect to the volume of photosensitive composition: and converting the generated set of images to a target distribution intensity model. In certain embodiments, the method includes c) backward projecting the target distribution intensity model by: generating an optical dose reconstruction; and comparing the optical dose reconstruction and the target distribution of gelation for modifying the model or to dose-threshold values.

In various embodiments, step c) further includes: determining locations within the volume of photosensitive composition apart from the target distribution of gelation receiving an optical dose above a predetermined dosage threshold.

In various embodiments, step c) further includes: removing the optical dose above the predetermined dosage threshold from the volume of photosensitive composition apart from the target distribution of gelation.

In various embodiments, the method further includes: d) calculating a removed optical dosage removed from the target distribution of gelation during the step c). In certain embodiments, the method includes e) adding the calculated removed optical dosage to the target distribution of gelation within of the initial model.

In various embodiments, calculated values get added or subtracted to and/or from the current model. Only the initial model is the same as the target distribution of gelation. In some embodiments, a filtering step is applied to the target distribution. If a filtering step is applied to the target distribution of gelation to generate a better initial guess for the model, there is never a model that is the same as the target distribution of gelation. In various embodiments, the "model" as described herein is an intermediate, mathematical construct that is used to optimize the calculated dose distribution that will be delivered by the images. In some embodiments, the model is allowed to be non-physical, for example by including negative values that don't have a physical correspondence. However, when this model is back projected and the resulting images thresholded (values adjusted to only positive intensity values), the resulting dose delivered to the photosensitive medium can be improved. This is one reason the method is called "object space model optimization."

In various embodiments, the adding of the calculated missing optical dosage to the target distribution of gelation within of the initial model is performed according to the equation:

$$M_{j+1,j+1} = M_{j+1,j} + \max\{0, D_h - f_{j+1,j}\},$$

where $D_h$ is a predetermined maximum dosage threshold, $M_{j,j+1}$ is the initial model with the removed optical dose at a j, j+1 iteration, $M_{j+1,j+1}$ is the initial model at a j+1, j+1 iteration, with the added removed optical dose, and $f_{j+1,j}$ is the target distribution of gelation in the volume of photosensitive composition at a j+1, j iteration.

In various embodiments, the method further includes f) iteratively repeating steps b) and c) for the initial model or a subsequently generated model that is generated by performing the steps a)-e).

In various embodiments, converting the generated set of images includes converting mathematical projections of the model into image intensities, which can include determining a set of negative image values within the generated set of images: and at least one of the following: i) setting each of the set of negative image values to a zero image value: or ii) assigning a constant negative value to the negative values, wherein the magnitude of the constant negative value depends on the amount of radical inhibitors in the photosensitive resin, and adding the absolute value of the constant negative value to an image-set, forming set of intensity images. In some embodiments, the absolute value referred to above can be determined or calculated as follows:

Step 1: Measure the dose to clear inhibitor in a resin.

Step 2: Calculate this dose as a percentage of the maximum dose that will be applied to a resin, beyond the inhibition-clearing dose, by a dose-reconstruction.

Step 3: Then, this percentage should equal the absolute value in question, divided by the maximum value in the image set.

More concisely, the ratio of the absolute value to the maximum value in the image set, should be equal to the ratio between the dose to clear inhibitor, and the maximum additional dose that is beyond this clearing dose.

In some embodiments, when modeling the effects of inhibition in the resin (as described herein), then the negative values do not get directly set to zero. Instead, the negative values are set to a constant negative value. That value depends on the amount of optical dose inhibition in the resin. Then, a constant value is added to the entire image set to make the image set be non-negative, with its minimum value at zero. In some embodiments, the object space optimization method described herein performs clipping of negative values in the image set, as well as potentially shifting, with the particular clipping and shifting value dependent upon the nature of the resin.

In various embodiments, the model for optical projection includes a plurality of voxels representing a digitized version of an object to be printed. In various embodiments, the determining the locations within the volume of photosensitive composition apart from the target distribution of gelation receiving an optical dose above a predetermined dosage threshold is performed according to equation (1):

$$M_{j,j+1} = M_{j,j} - \max\{0, f_{j,j} - D_l\}, \tag{1}$$

where $D_l$ is the predetermined dosage threshold, $M_{j,j}$ is the initial model at a j,j iteration, $M_{j,j+1}$ is the initial model with the removed optical dose at a j, j+1 iteration, and $f_{j,j}$ is the target distribution of gelation in the volume of photosensitive composition at a j,j iteration. Equation 1 determines how much excess dose each voxel outside of the target geometry is receiving and then subtracting these doses to update the model. Equation 1 serves to update the model depending on excess dose amounts, per out-of-part voxel, to so much to find the locations of these voxels.

In various embodiments, the method further includes selecting, for inclusion of the initial model, a set of property parameters for the target distribution of gelation in the volume of photosensitive composition prior to step b). In various embodiments, the method further includes applying a constant value of optical dose across the initial model prior to step b).

Although a constant value of optical dose can be applied, a constant dose is not always added. In various embodiments, the constant value is applied when a grayscale VAM algorithm for the printing of functionally graded materials is used. This constant value is added to a model and is purely mathematical. Forward projection, followed by clipping to convert to intensity, followed by applying these intensities over time, produce a dose. In some embodiments, in the grayscale algorithm, clipping to zero can occur, but it can also be the case that clipping to a negative values occurs instead, followed by a shifting step. This can happen when the grayscale algorithm is used for printing into an inhibited resin.

Both the binary-VAM and grayscale-VAM image computation methods optimize a model in object-space for the purpose of computing images for VAM printing. In both cases, after forward-projecting the model, if negative values are generated, they are clipped. The value to which they are clipped depends on the resin. For the most basic resins, they are clipped to zero. For resins that include inhibitor, they could be clipped to zero, or they could be further optimized by clipping a fixed negative value (dependent on the inhibition amount), then a shift is applied to the entire image set, pushing this fixed negative value to zero.

In various embodiments, step c) further includes determining optical projection ray trajectories for an optical projector. In various embodiments, selecting the initial model further includes determining an occlusion object within the volume of the photosensitive composition.

Method of Three-Dimensional (3-D) Printing

In various embodiments, a method of 3-D printing is provided. In certain embodiments, the method includes: providing a volume of a photosensitive composition having an axis of rotation and an angular motion relative to at least one light projector; optically projecting light onto a flat surface of the volume, wherein the flat surface is orthogonal to the axis of rotation: and printing an object from the volume of photosensitive composition based on the optical projections. In various embodiments, the light is optically projected at an incident angle relative to the flat surface of 1 to 89 degrees.

In various embodiments, a method of 3-D printing includes: providing a volume of a photosensitive composition having an axis of rotation and an angular motion relative to at least one light projector: optically projecting light at a non-flat surface of the volume at an incident angle of 1 to 89 degrees relative to the non-flat surface, wherein the non-flat surface of the volume is not orthogonal to the axis of rotation: and printing an object from the volume of photosensitive composition based on the optical projections. In various embodiments, the non-flat surface not orthogonal to the axis of rotation is parallel to the axis of rotation. In various embodiments, the non-flat surface is tilted relative to the axis of rotation by a tilt angle of 1 to 89 degrees. The method of 3-D printing where light is projected onto a non-flat surface that is not orthogonal to the axis of rotation can be used with any of the models and means described herein.

In various embodiments, the incident angle and the tilt angle are each independently 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, or 89 degrees.

In certain embodiments, the method includes: projecting optical projections according to the model onto the volume of photosensitive composition. In certain embodiments, the method includes: printing an object from the volume of photosensitive composition based on the optical projections. In various embodiments, the model used for determining how to project the optical projections into the volume of the photosensitive composition is according to any of the models described herein.

The volume of the photosensitive composition can be in a container of any suitable shape, such as a cylindrical shape or rectangular shape. The volume of the photosensitive composition can also be a sheet or tray having a removable optically opaque film. The container can be rotating relative to the light projector, or the light projected can be rotating relative to the container in order to create the relative angular motion between the light and container.

In some embodiments, the container can be submersed in a bath of liquid, such as oil, that serves to minimize changes in refractive index between the container and an external optical window. In some embodiments, a thin film of such an index matching liquid serves to minimize changes in refractive index between the container and an external optical window. Alternatively, the need for an index matching liquid can be removed by placing the resin immediately adjacent to the optical window through which patterned projected light is incident. In this case, the side of the window adjacent to the resin may be treated to minimize adhesion of polymer, through surface treatment or a layer specifically designed to suppress polymerization. In various embodiments, projecting light through the top or bottom of a container rotating relative to the rotation axis, where "top" or "bottom" means a surface with tangent orthogonal to the axis of rotation.

The light from the light projector that is incident on the flat surface of a container passes from the surface of the container directly into photosensitive composition. The light from the projector does not pass through any other medium, such as an index matching fluid, after passing through the container material into the photosensitive composition. The container material can be entirely optically transparent, partially optically transparent, or have regions that are optically absorptive, or combinations thereof. Optically absorptive regions do not permit transmission of any light (they are optically opaque). The flat surface (top or bottom) can be completely optically transparent, partially optically transparent, optically absorptive, or combinations thereof. Partially optically transparent regions transmit about 90, 80, 70, 60, 50, 40, 30, 20, or 10% of light from the light projector.

In various embodiments, the printed object includes a functionally graded material. In various embodiments, the printed object includes a dental aligner.

In various embodiments, the method further includes injecting the volume of photosensitive composition into a printing mold prior to the projecting. In various embodiments, the method further includes contacting, subsequent to the printing, a degradation stimulus with the volume of photosensitive composition for degrading a portion of the photosensitive composition that remained uncured. In various embodiments, the degradation stimulus can be heat, light, or a liquid chemical that dissolves or transforms a solid such that it can be removed with a solvent.

In various embodiments, the method further includes conducting an optical metrology process for the part being printed, via a microscopy instrument, a tomography instrument, or a combination thereof. In various embodiments, the optical metrology process can be performed during the printing process. In various embodiments, the method further includes contacting a fluorescent or absorbing dye with the volume of photosensitive composition prior to the optical metrology process. In various embodiments, the conducting includes optical metrology of birefringence of the part during or after the printing. In various embodiments, information from metrology performed during or after the printing process may be used to control the printing process including the intensity or time of the images used to expose the resin.

3-D Printing Assembly

In various embodiments, a printing assembly for volume additive manufacturing (VAM) printing is provided. The printing assembly, in some embodiments, can move with the printed part through the manufacturing process, including delivery of resin to the printer, optical exposure of the liquid resin to transform it into a solid part, transfer of the unfinished part between processes, post processing such as removal of remaining liquid resin, removal of the printed part from the printer, and/or delivery of the finished part beyond the printer.

In certain embodiments, the assembly includes: an exterior shell defining a cavity. In certain embodiments, the assembly includes: a volume of a photosensitive composition having at least one flat surface and contained within the cavity. In various embodiments, the assembly includes at least one light projector configured to project light onto the flat surface of the volume at an incident angle relative to the flat surface of 1 to 89 degrees. In various embodiments, the assembly includes a means for generating relative angular motion between the volume and the light projector. In various embodiments, in the assembly, the volume of the photosensitive composition has an axis of rotation and the flat surface is orthogonal to the axis of rotation. Means for generating relative angular motion between the photosensitive composition and the light projector include a rotating plate or other surface upon which the photosensitive container is affixed to.

As noted herein, the printing assembly can be configured to project light at a non-flat surface that is not orthogonal to the axis of rotation, or configured such that the non-flat surface is tilted relative to the axis of rotation by a tilt angle of 1 to 89 degrees. In various embodiments, the incident angle and the tilt angle are each independently 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, or 89 degrees.

The photosensitive composition can be inside of a container as described herein, whereby rotation of the photosensitive composition in the container causes the photosensitive composition to have an angular motion. For example, and without limitation, the photosensitive composition can be rotated via a rotation motor on a rotation stage. Alternatively, in some embodiments, a container holding the photosensitive composition can be stationary and printing images can rotate relative to the fixed container. Examples include rotation of the projector itself, or the use of a scanner between a fixed projector and the fixed container. Such a scanner may use rotating optical elements such as mirrors, prisms, or diffraction gratings, to cause the optical images to rotate relative to the container with an appropriate angular motion. In one contemplated embodiment, an array of projectors surrounding the resin provide the needed projection angles, and simulate movement of a single projector, and in such a case the angular motion of the light projector is an apparent angular motion, since neither the light projector(s) or the photosensitive composition are in actual motion. Thus, the angular motion referred to herein can be a real angular motion (motion of a component) or an apparent angular motion (apparent motion due to on/off switching of light projector(s)).

In various embodiments, the temperature of the exterior shell is controlled during a photocuring process, after the photocuring process, or both. In various embodiments, at least a portion of the exterior shell is composed of an optically transparent material within a defined wavelength range. In various embodiments, the defined wavelength range for the optically transparent material can be a range defined between at least two of the following wavelengths of light: about 250, 255, 260, 265, 270, 275, 280, 285, 290, 295, 300, 305, 310, 315, 320, 325, 330, 335, 340, 345, 350, 355, 360, 365, 370, 375, 380, 385, 390, 395, 400, 405, 410, 415, 420, 425, 430, 435, 440, 445, 450, 455, 460, 465, 470, 475, 480, 485, 490, 495, 500, 505, 510, 515, 520, 525, 530, 535, 540, 545, 550, 555, 560, 565, 570, 575, 580, 585, 590, 595, 600, 605, 610, 615, 620, 625, 630, 635, 640, 645, 650, 655, 660, 665, 670, 675, 680, 685, 690, 695, 700, 705, 710, 715, 720, 725, 730, 735, 740, 745, 750, 755, 760, 765, 770, 775, or about 780 nm.

In various embodiments, at least a portion of the exterior shell is composed of an optically absorbing material within a defined wavelength range. In various embodiments, the defined wavelength range for the optically absorbing material can be a range defined between at least two of the following wavelengths of light: about 250, 255, 260, 265, 270, 275, 280, 285, 290, 295, 300, 305, 310, 315, 320, 325, 330, 335, 340, 345, 350, 355, 360, 365, 370, 375, 380, 385, 390, 395, 400, 405, 410, 415, 420, 425, 430, 435, 440, 445, 450, 455, 460, 465, 470, 475, 480, 485, 490, 495, 500, 505, 510, 515, 520, 525, 530, 535, 540, 545, 550, 555, 560, 565, 570, 575, 580, 585, 590, 595, 600, 605, 610, 615, 620, 625, 630, 635, 640, 645, 650, 655, 660, 665, 670, 675, 680, 685, 690, 695, 700, 705, 710, 715, 720, 725, 730, 735, 740, 745, 750, 755, 760, 765, 770, 775, or about 780 nm.

In various embodiments, the optically transparent or optically absorbing portion can be a flat surface that bounds or otherwise contains the photosensitive resin. In various embodiments, the optically transparent or optically absorbing surface can be:

the surface of the resin itself, or part of the transportable printing assembly, or part of the printer, and adjacent to this optically transparent or optically absorbing is a volume of resin that is addressed by the optical writing system. This resin may be in a vat, flowing e.g. in a microfluidic channel, or in a transportable printing assembly.

In various embodiments, the projected light is not coupled into this flat surface through a planar region of index matching liquid. In various embodiments, the optically transparent or optically absorbing flat surface is on the resin container.

In various embodiments, the assembly includes a cover portion configured to be removed from an exterior surface of the exterior shell, wherein the cover portion is composed of a light-shielding material capable of blocking light transmission within a range of wavelengths. In various embodiments, an interior surface of the exterior shell is composed of, or is in contact with, an adhesion suppression material or an adhesion promotion material.

In various embodiments, the assembly includes a physical structure contained within the cavity adapted or configured to support a printed object printed from the photosensitive composition. In various embodiments, the physical structure includes a proximal end and a distal end, wherein the proximal end is in contact with an interior surface of the exterior shell, and the distal end is configured or adapted to be in contact with the printed object once printed. In various embodiments, the physical structure is further adapted or configured to be degradable based on exposure to a heat stimuli, a mechanical stimuli, a light stimuli, a pH stimuli, a chemical species for initiating a chemical reaction, or a combination thereof. In various embodiments, the printed object includes a dental aligner.

In various embodiments, a portion of the volume of photosensitive composition that remains unreacted after printing is configured to be removed via solvent immersion or flow over or through the photosensitive composition. In various embodiments, the exterior shell further defines one or more apertures configured or adapted to transfer a volume of solvent, the volume of photosensitive composition, a chemical species for initiating a chemical reaction, a volume of another photosensitive composition, or a combination thereof, within the cavity. In various embodiments, the one or more apertures are further configured or adapted to receive an injection of the volume of solvent, the volume of photosensitive composition, the chemical species for initiating a chemical reaction, the volume of the other photosensitive composition, or a combination thereof. The chemical species for initiating a chemical reaction can be, in some embodiments, a catalyst. In various embodiments, the exterior shell forms a U-shape.

Iterative Algorithm for Binary VAM

Figure 1:
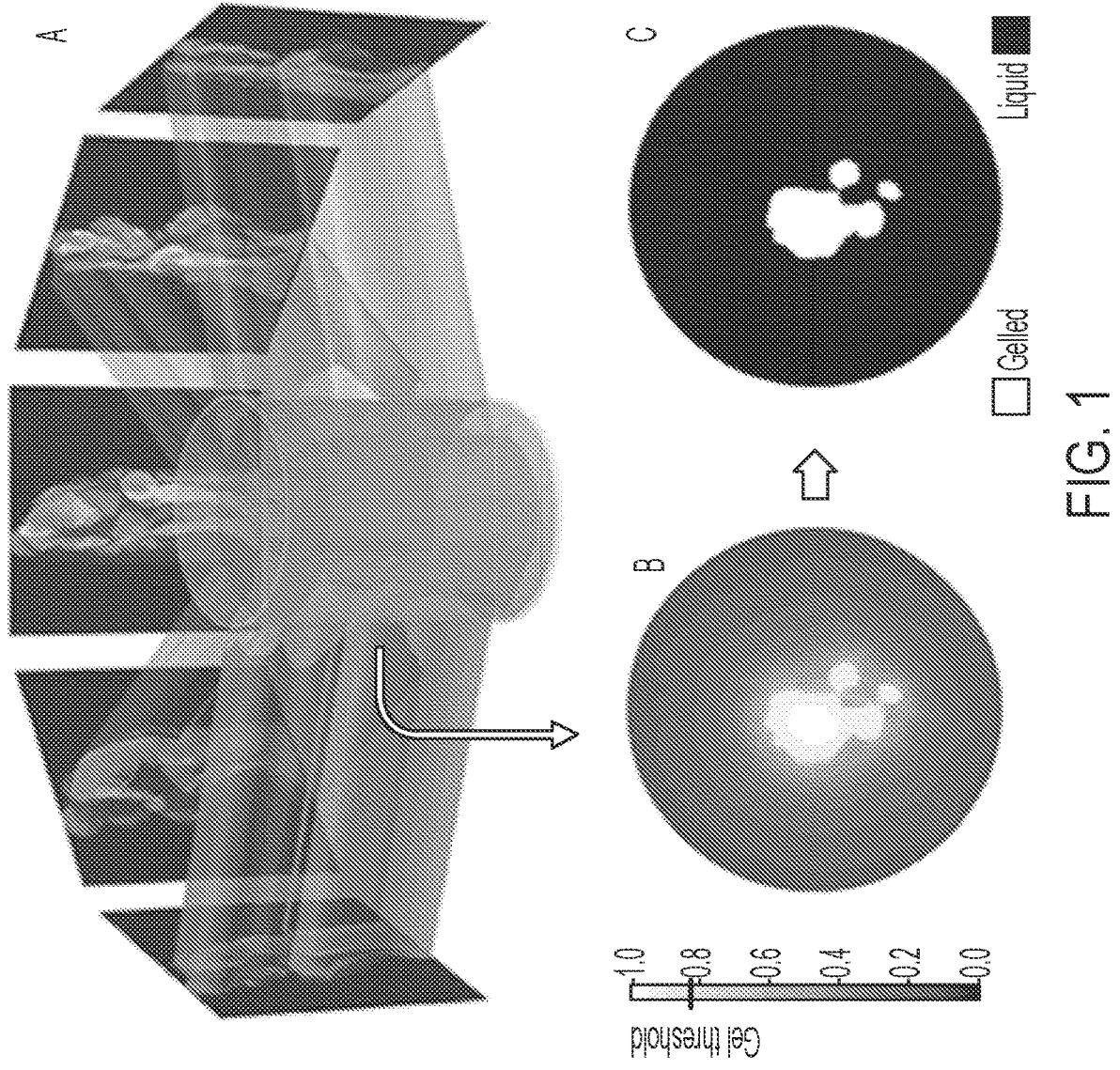
FIG. 1 depicts an overview of volumetric additive manufacturing (VAM). Panel (A) depicts computed images, optically projected into a vial of photosensitive rein. Panel (B) depicts a cross-section of accumulated optical dose distribution (normalized units of dose). Panel (C) depicts a gelled cross-section: resin gels where the optical dose is above a threshold, forming a 3D printed part that is removed from remaining liquid resin.
Figure 2:
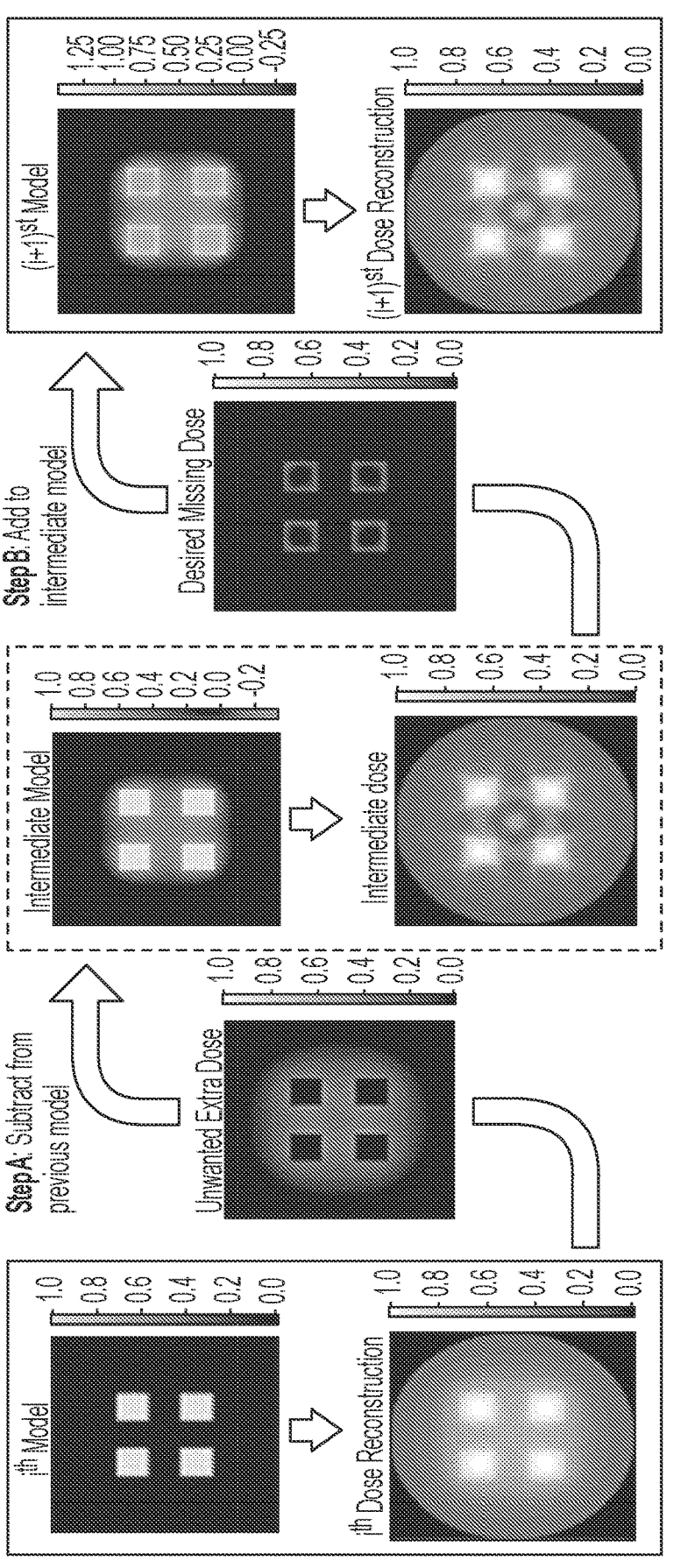
FIG. 2 depicts a model update algorithm for binary-gelation VAM printing. The left column depicts a model of a target-structure that is forward-projected, then back-projected to form an optical dose reconstruction, as illustrated in FIG. 3. Step A: unwanted extra dose in the out-of-part regions of the reconstruction is computed and subtracted from the model to form an intermediate model. The extra dose that lies above a lower-threshold is included. Middle column: the resultant model is then used to compute a dose-reconstruction. Step B: The prior step of subtracting out-of-part values from the model, inadvertently reduces some desired dose in the in-part regions. This missing in-part dose is calculated by comparing the in-part reconstruction voxels to an upper-threshold. These values are then added to the intermediate model, completing one model-update iteration.

For a simple VAM projection model, where each projection beam is assumed to be laterally-uniform and non-diverging, and attenuation through the resin obeys Beer-Lambert exponential intensity decay, transformation between volumetric dose and image-set is well-described by the Attenuated Radon Transform (ART). Back projection (projection from image-set into volume), as is physically implemented while printing, is modeled with the inverse ART. The simplest method of generating an image set from a desired object is to mathematically perform a forward projection from object to image-set, using the ART. However, back-projecting the resultant image-set results in a reconstruction with unwanted, low spatial-frequency extra dose, a consequence of sampling non-uniformities in a radial geometry. FIG. 2, left column, depicts an object and the reconstructed dose that results from forward-projecting the object, then back-projecting the resultant set of images. Instead of optimizing the intermediate image-set to avoid this unwanted extra dose, the disclosure presented herein provides for iteratively optimizing a model of the desired structure, which, when then used to compute an image-set, results in a desirable reconstruction.

In various embodiments, the methods described herein achieve a particular contrast for the dose reconstruction. This contrast is measured by the "process window." Within the context of printing a particular object, a process window is the difference between the smallest dose of an in-object (in-part) voxel you want to print and the highest dose of an out-of-object (out-of-part) voxel you don't want to print. Without wishing to be bound by theory, the present methods are distinguishable from prior methods because prior methods merely tried to separate in-part dose and out-of-part dose around a gel point dose. In one embodiment, the process window can be used to compensate for error tolerances in a VAM printer, for example. Identifying the error tolerances provides a window a dose reconstruction must attain to print the object/shape without errors, thereby setting, in one embodiment, the $D_{low}$ and $D_{high}$ parameter values for the methods described herein.

Figure 3:
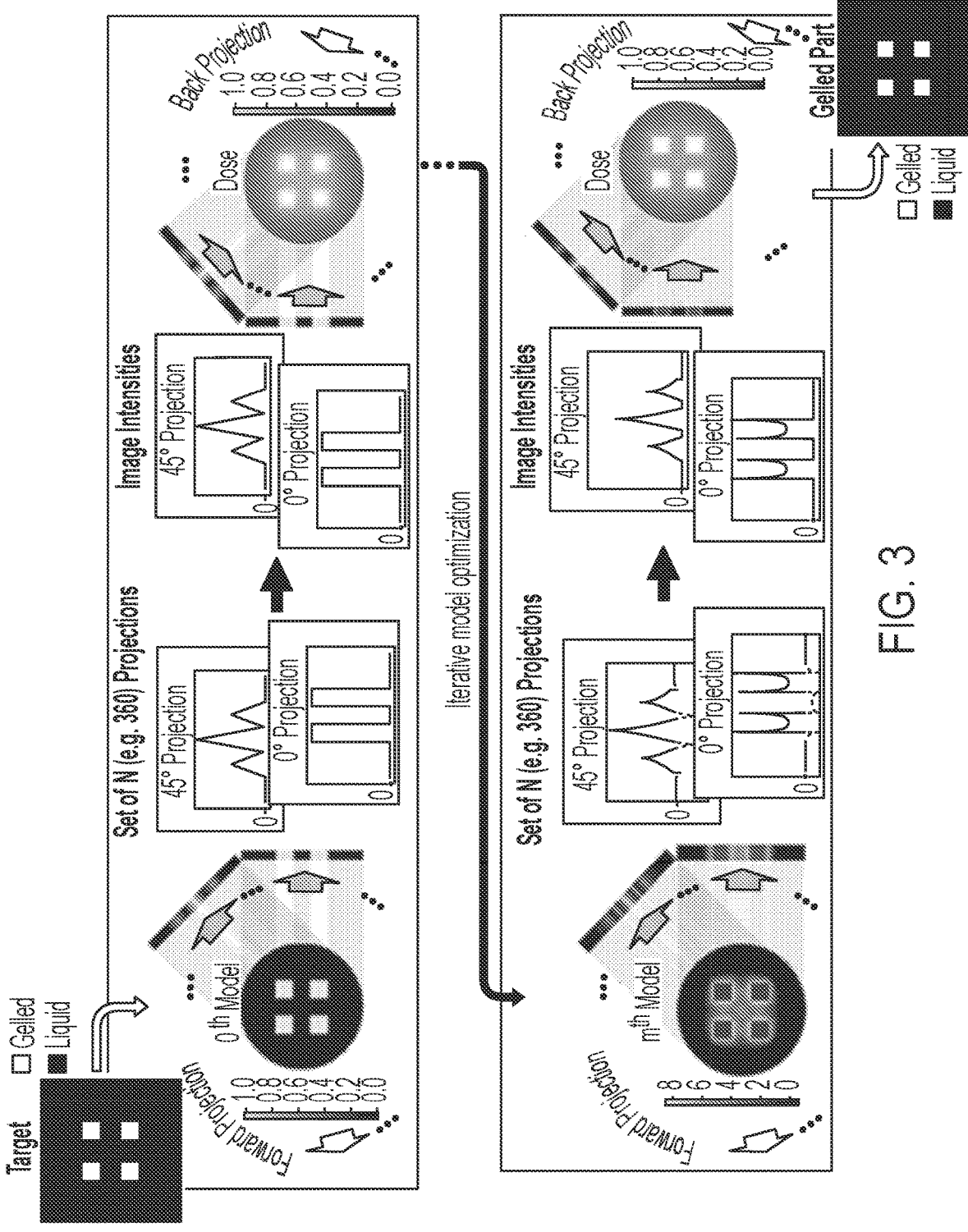
FIG. 3 depicts an overview of model optimization to compute an image set for VAM binary-gelation printing. Each model-update iteration is made via the process shown in FIG. 2. A desired part (a distribution of gelation) serves as an initial model. The model is forward projected to form a set of images (e.g., 360) images—one per degree). These projections are converted to image-intensities by setting any negative image-values to zero. They are then back-projected to form a dose-reconstruction. Note that the initial model may produce no negative values, but results in a reconstruction with a background glow of unwanted dose. A new model is computed via the steps shown in FIG. 2. This model is forward-projected, and any negative values are set to zero, yielding a physically-realizable image-set. This image-set produces an improved dose-reconstruction, with further iterations improving the model and thus the resulting reconstruction.

The optimized model is non-physical, and can contain negative values. However, the model can produce image-sets and dose-reconstructions that are non-negative, and thus physically realizable. The process of computing a non-negative image-set (and its dose-reconstruction) is depicted in FIG. 3. The model is forward-projected, and resultant negative image-values are set to zero. This image-set is then back-projected to form a reconstruction, whose units are normalized. Once optimization is complete, with a good image-set computed, the image-set is scaled to match the intensity of a real optical projection system. The algorithm can be mathematically defined as follows: Let $f_T$ be a target function (the desired geometry to print). Let P be a forward-projection operator, and P* a back-projection operator (that is, $Pf_T$ is the forward projection of $f_T$, from object to image-set, and $P*Pf_T$ is the back-projection of that image-set, back into object-space). Let N be a normalizing operator that divides an input by its maximum. Let $D_l$ and $D_h$ be fixed high and low dose-threshold values, where $0 < D_l < D_h < 1$. Let $M_{j,j}$ be the object model after j iterations, where the initial model is defined to be $M_{0,0}=f_T$. Lastly, let $f_{j,j}=NP*max \{0, P M_{j,j}\}$. That is, the model is forward-projected, any resultant negative values are set to zero, the result is back-projected, and the reconstruction is normalized. Then, the steps to update a model $M_{j,j}$ by one iteration to $M_{i+1,j+1}$ are as follows:

STEP A: Update the model by subtracting from out-of-part voxels with an excess of dose. For only the out-of-part voxels (in-part voxels remain unchanged from previous model, $M_{j,j}$):

$$M_{j,j+1} = M_{j,j} - \max\{0, f_{j,j} - D_l\},$$

and for producing the reconstruction: $f_{j+1,j+1}=NP*max \{0, PM_{j+1,j+1}\}$

STEP B: Update the model by adding missing dose to the in-part voxels. For only in-part voxels (out-of-part voxels remain unchanged from $M_{j+1,j}$):

$$M_{j+1,j+1} = M_{j+1,j} + \max\{0, D_h - f_{j+1,j}\},$$

and for producing the reconstruction: $f_{j+1,j+1}=NP*max \{0, P M_{j+1,j+1}\}$.

The max{ } operation in STEP A suggests that for each out-of-part voxel, some extra dose is subtracted from the previous model, but not all the way to zero. Instead, the value is subtracted only down to $D_l$. Similarly, the max{ } operation in STEP B means that for each in-part voxel, some extra dose is added to the previous model, but only to reach the value of $D_h$ and not to reach the highest-possible value of 1. Instead of attempting to achieve a perfect reconstruction (a binary dose distribution), the algorithm can push the reconstruction towards a reduced-contrast solution. This can allow the in-part and out-of-part regions to be non-uniform in dose as long as the doses lie above and below $D_h$ and $D_l$, respectively. Thus, the two parameters have physical meaning in the object-space: the parameters set the lower and upper goal-bounds on in-part and out-of-part doses, respectively.

This algorithm is free of derivatives and cost-functions, making it simple and easy to code, especially in any language that includes projection functions. The algorithm exhibits convergence: the initial model can be random numbers, and the method still converges to a satisfactory solution. The algorithm is also simple to understand, as computations are made in object space as opposed the more abstract set of writing-images, and it has only two parameters that directly correspond to object-space dose-constraints.

The two parameters, $D_l$ and $D_h$, push the solution in contradictory directions; one enforces a decrease of out-of-part dose, and one an increase of in-part dose. The choice of these values affects competing aspects of reconstruction quality.

Reconstruction Quality Metrics

Figure 4:
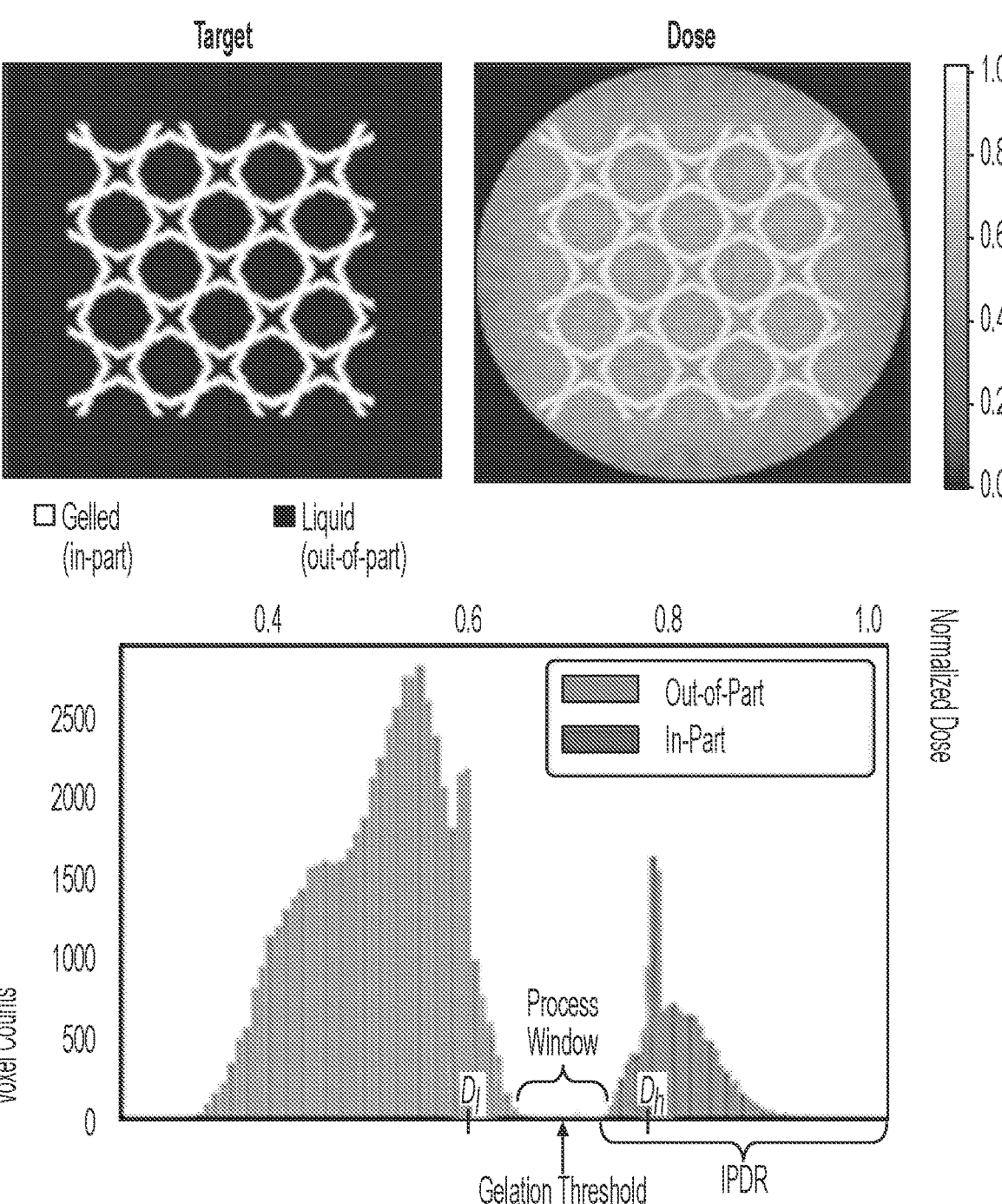
FIG. 4 depicts reconstruction quality metrics for binary-gelation VAM printing. Upper-left: A target geometry to be printed. Upper-right: An optimized dose-reconstruction, shown in normalized units of dose. The parameter values were $D_l=0.6$ and $D_h=0.8$. Bottom: The distribution of doses in the reconstruction for the in-part and out-of-part regions. Since the histograms do not overlap, Voxel Error Rate (VER) is 0, and thus the gel threshold is above all out-of-part voxels, and below all in-part voxels. Therefore, this dose-distribution will print a part that theoretically exactly matches the target geometry. The Process Window is the distance between histograms, and represents room for error with optics or materials, or print timing, or a variety of other sources of error. As long as dose is applied such that the gel threshold lies within the process window, the part will gel in the correct shape. The In-Part Dose Range (IPDR) is the range of doses, as a fraction of maximum dose, that in-part voxels receive.

Three metrics are defined for evaluating the quality of a reconstruction: Voxel Error Rate (VER), Process Window (PW) size, and In-Part Dose-Range (IPDR). All three can be understood while viewing in-part and out-of-part histograms of reconstruction dose, e.g. as depicted in FIG. 4. For normalized units of dose, a perfect reconstruction would yield an out-of-part histogram with values only at 0 and an in-part histogram with values at 1. In reality, reconstructions can yield two non-overlapping histogram peaks such that when the gel-threshold lies between them, all in-part voxels gel while all out-of-part voxels do not. An example of a reconstruction with non-overlapping in-part and out-of-part dose histograms is shown in FIG. 4.

Any overlap between histograms indicates errors in the final gelled part, as any gel threshold will result in some error voxels (voxels that gelled when they should not have, and vice versa). This is termed as Voxel Error Rate (VER), defined as VER=W/N, where W is the number of out-of-part voxels that receive more dose than the lowest-dosed in-part voxel, and N is the total number of voxels in the reconstruction. Graphically, VER is the area of the out-of-part histogram that overlaps with the in-part histogram, normalized to the sum of the histogram areas. For any reconstruction with VER>0, the final part may not match the target function, no matter how ideally instantaneous (in dose) the gel threshold of a resin is.

Process Window is defined as the difference, in dose, between the highest-dose out-of-part voxel, and the lowest-dose in-part voxel. Graphically, this is the distance between the inner edges of the histograms. A large process window can allow for, without penalty to VER, a non-ideal gel-threshold that occurs over a range of doses, for non-uniformities in optics, for uncertainty in the gel-threshold dose-location (e.g. due to imprecisions in measuring photo-initiator concentration when mixing resins), and the like. Thus, a large process window may be desirable in some cases, as it makes it practically easier to gel the in-part voxels without accidently going too far in dose, and gelling any out-of-part voxels.

In-Part Dose-Range (IPDR) is defined as 1 minus the lowest-dose in-part voxel. IPDR can be an indication of dose-variation of in-part-voxels. This metric may be important in VAM printing because all optical dose may not be delivered instantly. Instead, dose may be delivered over time by a projection system with limited dynamic range. A consequence of a large IPDR is that high-dose in-part voxels can surpass the gel threshold before other portions of the part. Once this happens, these gelled regions (with their increased index of refraction) can scatter subsequent writing beams, which can interfere with the completion of dose-delivery to the rest of the part.

Choosing the Two Parameter Values

If a perfect, binary (none or maximum only) dose-reconstruction were possible, the parameter values would be chosen to be $D_l$=0, and $D_h$=1. Then the algorithm would push out-of-part dose to zero, and in-part dose to 1 (in normalized units of dose). However, since such a reconstruction is not possible (due to the lack of negative-intensity images), choosing these extreme values may result in a poor reconstruction with non-zero VER (thus leading to poor print fidelity upon gelation). Relaxing these constraints reduces the contrast of the dose-reconstruction, but can drive VER to zero. This is because choosing $0<D_l$, and $D_h<1$ increases the freedom of the reconstruction, since voxels are constrained only to a range and not to particular values. Thus, in-part doses are above $D_h$ while out-of-part doses are below Di. This produces reconstructions with reduced contrast, but with improved VER.

While some parameter optimization may slightly improve particular target-functions, the values $D_l$=0.85, and $D_h$=0.9 can result in reliable convergence to a VER of zero for targets. Choosing lower values, such as $D_l$=0.45, $D_h$=0.5, may result in a slightly larger process window, as the increase in IPDR relaxes some reconstruction constraints for in-part voxels. Similarly, choosing values such as $D_l$=0.99, and $D_h$=1 may result in a small IPDR at the cost process window size, and, for complex target structures, even reduced VER. Similarly, it is possible to request a larger than possible process window size from the algorithm by choosing excessively separated parameter values. E.g. for all but simple targets, a choice like $D_l$=0.2, and $D_h$=0.9 will not only fail to increase process window size, but it may also increase VER from zero. Lastly, as the choice of parameter values changes the magnitude by which map-voxels change upon each iteration, they can slightly affect the rate of convergence of the algorithm. Regardless of optimization possibilities, the values of $D_l$=0.85, and $D_h$=0.9 yield reconstructions that improve upon previous methods.

Performance Comparison Example to Prior Models

The original VAM method published by UC Berkeley used gradient-descent optimization on image-sets. Described below is an example reconstruction comparing the performance of the algorithm described by UC Berkeley with the object-space algorithm provided by the present disclosure.

Figure 5:
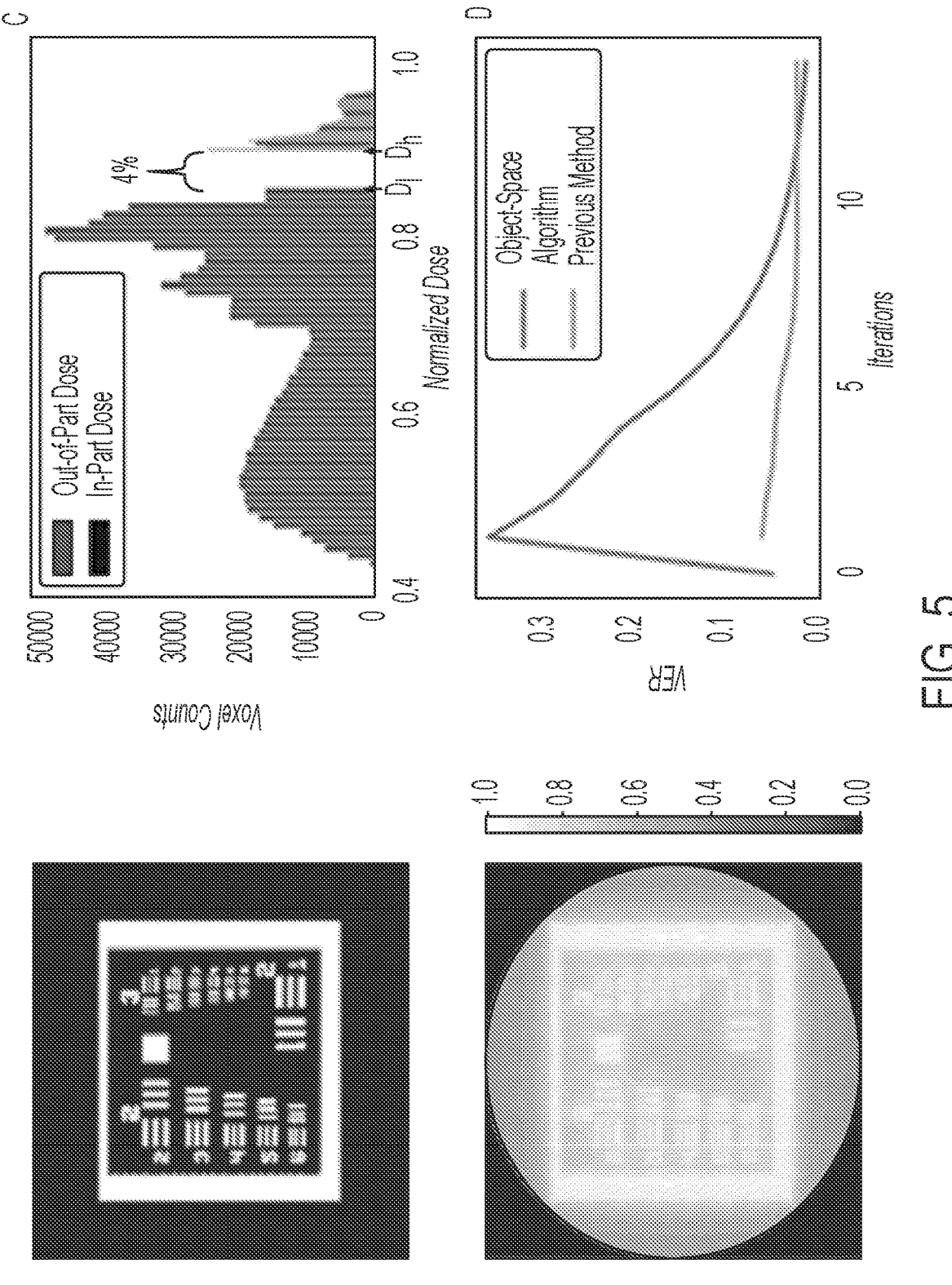
FIG. 5 depicts a convergence comparison example with a previously-published VAM method. Panel (A) depicts a binary target geometry. Panel (B) depicts a dose reconstruction using the methods described herein. The parameter values used were $D_l=0.85$, and $D_h=0.9$; annotated in Panel (C) is the distribution of doses from Panel B. In this reconstruction, VER=0, and the process window size was 4% of the maximum dose. Note that the choice of the $D_l$ and $D_h$ values have the effect of pushing the out-of-part and in-part histograms apart, to be below and above the parameter values, respectively. Panel (D) depicts convergence comparison between algorithms. The Berkeley algorithm (bottom line of legend), plateaued at a 2% VER after 15 iterations; further iterations did not improve its result. Since VER>0, a print would have voxels with gelation error. The object-space-algorithm presented here (top line of legend) converged to a solution with not only a VER of zero, but a process window of 4%.

FIG. 5 depicts the object used for this comparison: a resolution target. FIG. 5D illustrates convergence of the two algorithms over the first 15 iterations. Note that object-space filtering step initially exhibits a lower VER than the zero-clipped FBP Berkeley initial guess (FIG. 5D). The reason the VER increases for one iteration, before monotonically decreasing, is that for this object, the filtering step produces a reconstruction with a dose range significantly different than the target $D_l$=0.85, and $D_h$=0.9 range. Here, pushing the solution away from its current dose-range, to the desired dose-range, increases VER for one iteration.

The object-space binary VAM algorithm eventually converges to a VER of zero (and thus no gelation errors), while the Berkeley algorithm plateaus at a 2% VER, meaning that a print made with the resultant image set would have out-of-part regions that gelled, and in-part regions that did not. Additionally, the object-space algorithm produces a reconstruction with a process-window size of 4% while constraining the in-part dose to lie in the upper 10% range. In real-lab printing, a non-zero process window leaves room for optics, material, and timing imprecisions without impacting print-fidelity, and the IPDR of 10% helps mitigate the problem of a few in-part voxels gelling early in the print, then scattering subsequent writing beams. Thus, the object-space algorithm results in a reconstruction-quality improvement over the Berkeley method that started the field of VAM.

Grayscale VAM Printing Algorithm

The field of VAM printing has been thus far limited to binary printing, in which voxels are either gelled to become part of a print, or remain liquid. However, it is possible to cure resin with a greater degree of control, creating functionally graded properties through a printed part. Whether the objective is to control modulus, refractive index, or any other dose-tunable property, arbitrary 3D property control requires arbitrary 3D control over applied optical dose. The particular dose required depends on calibration measurements of a material's property-dose response. What is called the Grayscale VAM printing problem, then, is to compute the image-set that will reconstruct such an arbitrary optical dose distribution.

To create an initial object-model an object-space ramp filter is applied to the object, as described above. For a grayscale object, this produces a dose-reconstruction that resembles the object. However, reconstructions exhibit reduced contrast, as well as other imperfections. This is unsurprising, as grayscale reconstructions are highly constrained—they attempt to achieve a particular function value at every point in a reconstruction, not just voxels that lie above or below threshold values.

Figure 6:
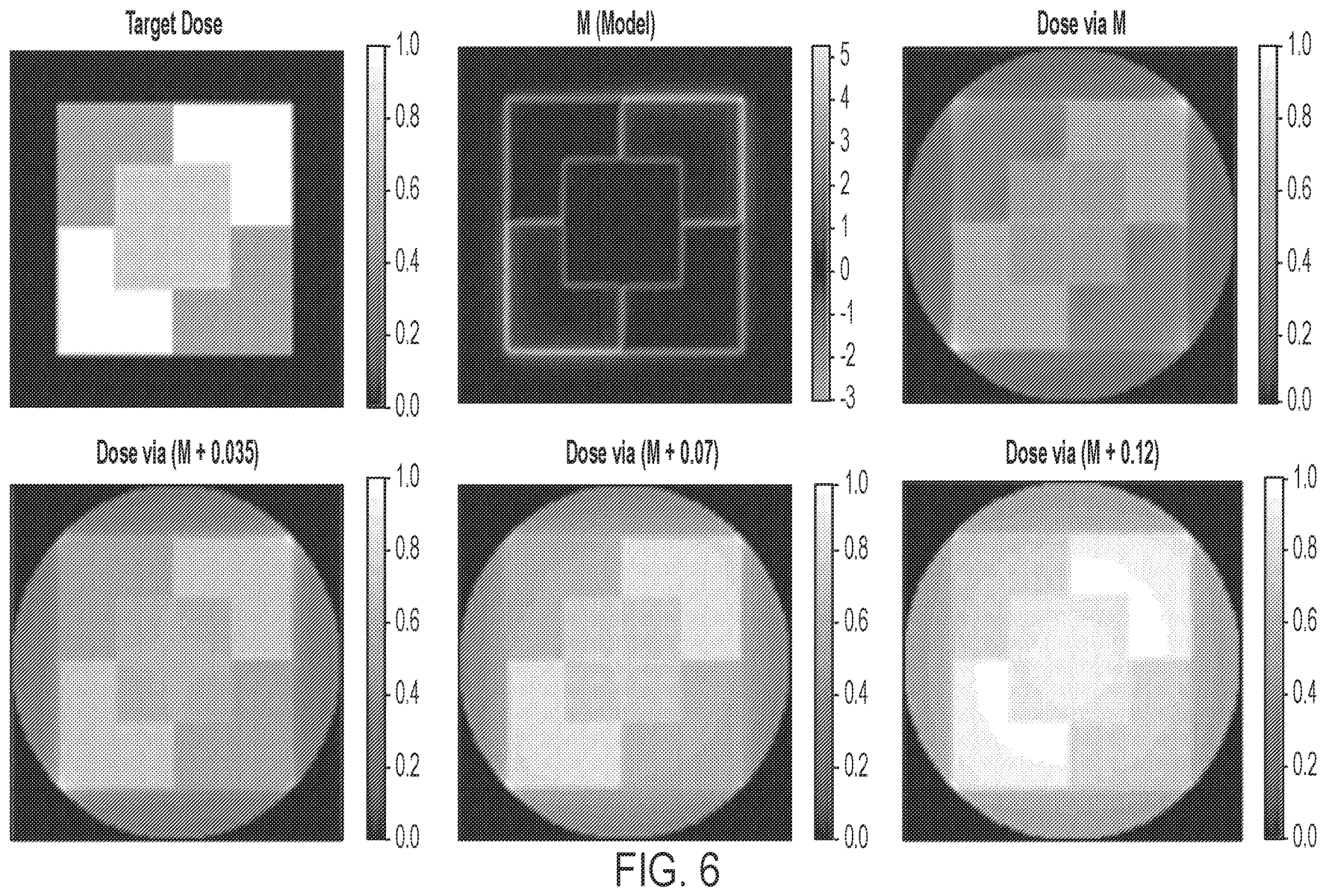

A reconstruction's reduced contrast (compared to the target) does, however, present a degree freedom. The location of the reduced-contrast reconstruction can be adjusted within the available dose-range of a reconstruction. FIG. 6 shows an example of this. A grayscale target function is frequency-filtered to form a model. That model produces a reduced-contrast dose-reconstruction. Adding a constant value to the model will shift where, in the reconstruction's dynamic range, the object will be reproduced. Adding a negative value to the model allows for adjustment in the opposite direction, better-matching the smaller values of the target function. This process allows for the selection of values from the original target structure get most-accurately reproduced. This method allows for adjustable approximations, opening the door to the application of VAM to the fabrication of functionally graded structures.

Binary Printing with Inhibition

Resins containing radical inhibitors exhibit a delay in applied optical dose before the start of polymeric conversion. This delay, or inhibition period, is caused by radical inhibitors reacting with photo-generated radicals at a much higher rate than monomer-radical reactions. Only once the inhibitor is locally depleted does significant polymeric conversion commence. Oxygen can provide a small inhibition period, and is often inadvertently included in photosensitive resins. A larger inhibition period can be engineered by the inclusion of a radical inhibitor. In VAM printing, inhibition relaxes the requirements of an optical tomographic reconstruction, as it increases the allowable dose without gelation in the out-of-part regions. Accounting for a small amount on inhibition during image computation significantly improves the contrast in simulated material conversion between in-part and out-of-part regions in a VAM print. An alteration to the binary VAM algorithm described above can model this effect during VAM image computation.

As noted in previous papers, inhibition is mathematically equivalent to including negative values in image-sets, with larger inhibition periods corresponding to larger negative magnitudes. In terms of conversion, inhibition effectively subtracts from the dose applied in object-space. Via the Radon Transform's linearity, this effect is equivalently described as a subtraction in image-space, resulting in negative values in simulated image-sets. Thus, for computational convenience, subtracting effect of inhibition can be applied in image-space, instead of in object-space. The relative magnitude of negative and positive image-set values can be the same as the relative inhibition and polymeric conversion periods, respectively.

Implementing this effect for image-computation optimization requires an alteration to the binary VAM algorithm.

Given a minimum negative image-value, $g_{min}$, to account for these simulated negative values in the binary VAM algorithm, the image values can be truncated to $g_{min}$ instead of to 0. Then, upon calculating a reconstruction, any negative dose values in object-space are set to zero, since they correspond to no polymeric conversion. That is, all of the reconstruction steps described in above, such as $f_{j,j}=NP^*max \{0, P M_{j,j}\}$, become $f_{j,j}=max \{0, NP^*max\{g_{min}, P M_{j,j}\}\}$. Once a final image-set has been computed, the images are shifted by a constant such that their smallest value is zero (again, relying on the linearity of the Radon Transform). The rest of the algorithm can remain unchanged.

Image Computation for the Control of Material Properties

The problem of arbitrarily controlling material properties in a 3D volume via VAM printing requires multiple inversion steps. For material property being a function, f, of polymeric conversion, conversion being a function, q, of optical dose, and optical dose being a function, h, of projection image set, an arbitrary 3D distribution of material property can be, $MP=f(q(h(image set)))$. Thus, to compute the image set that results in a desired distribution of material properties, the inverse problem: image set=$h^{-1}(q^{-1}(f^{-1}(MP)))$ can be solved. Inverting f and q is an experimental measurement calibration step yielding monotonic functions that are empirically collected. Inverting h can be approximated by the grayscale reconstruction algorithm described above. Finally, the effects of inhibition can be included, as in the binary-gelation printing case, by allowing negative values in the projection sets, the magnitude of which is determined by the inhibition period of the resin.

Image Computation for More Complex Projection Models

Real VAM printing does not occur with ideal, laterally-uniform, perfectly sharp, perfectly non-diverging beams. Likewise, when over-printing around occluding structures, the ideal tomographic condition where each beams spatially overlaps with all other beams is broken. Fortunately, the Binary VAM Algorithm is still effective, without modification, for more complex projection models than the ART.

Gaussian beam projections can be modeling by changing the line integrals used in the Attenuated Radon Transform (ART) from straight paths, to curved paths represented by a Gaussian kernel. This tends to concentrate dose towards the center of a reconstruction. It also effectively reduces the degrees of freedom of a reconstruction, since each image-set pixel addresses a larger region within the reconstruction (the out-of-focus parts of the Gaussian beams), resulting in an increased overlap with other writing beams. Both effects increase the difficulty of achieving good tomographic reconstructions, with more iterations needed to achieve an inferior reconstruction (e.g. process window size), as compared to the ideal non-diverging beam case. The ability to model Gaussian beam projections becomes especially important when a long depth of focus cannot be achieved experimentally, resulting in beams that are significantly non-collimated. This may occur, for example, when using LED illumination instead of higher etendue laser-sources, or when applying VAM at especially large or micro scales.

Similarly, image computation for printing around occlusions requires that ART line integrals be truncated at the occlusions. This also reduces the freedom of a tomographic reconstruction: however the binary VAM algorithm can still work without modification. Such computation can be used, for example, for applications involving over-printing around existing, occluding structures.

Image Computation for Alternate Printing Geometries

Figure 7:
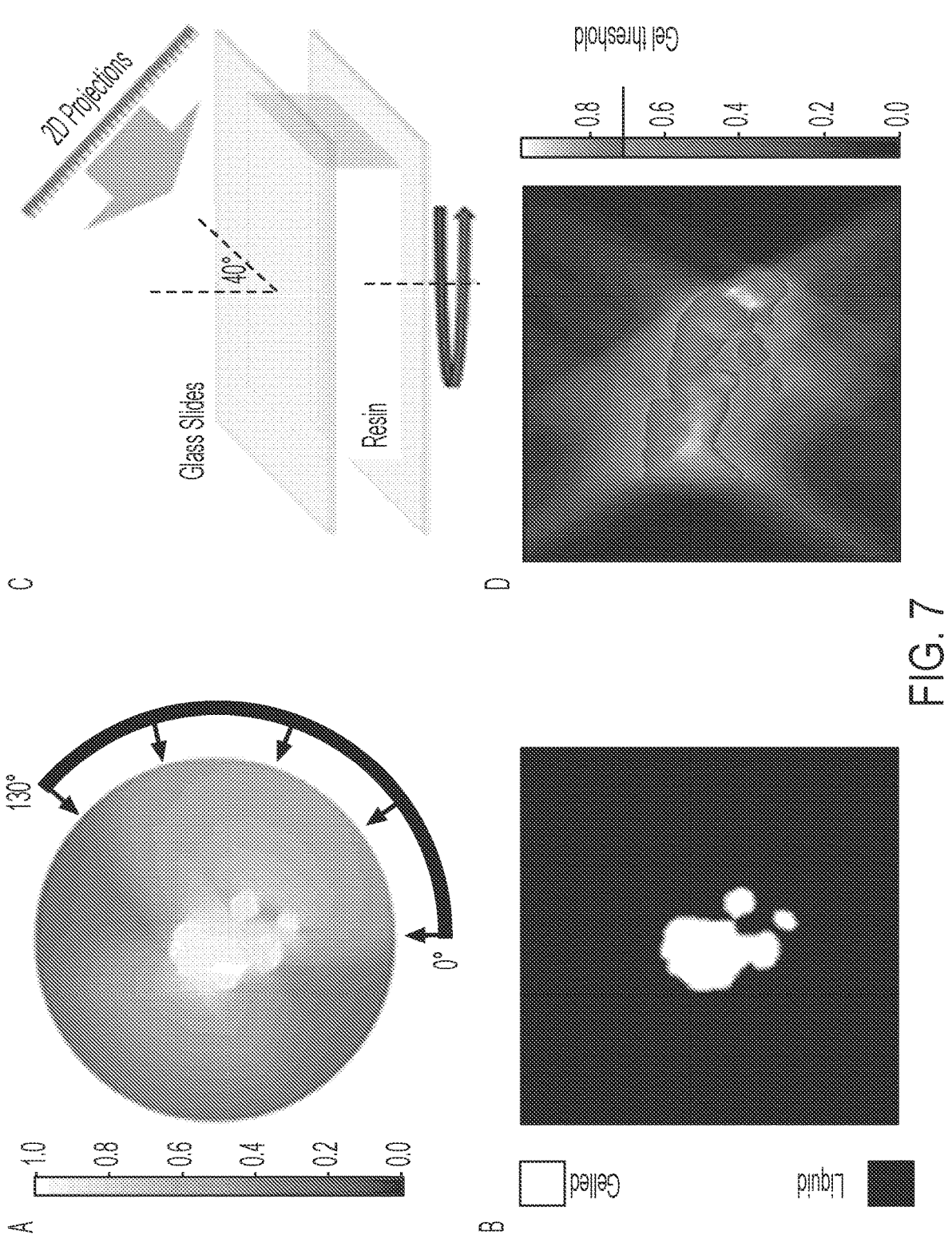
FIG. 7 depicts various aspects of the claimed method. Panel (A) shows a 2D dose reconstruction yielding a VER of zero, made by a set of projections over only a 130° range, with $D_l=0.78$ and $D_h=0.79$. Panel (B) shows a gelation threshold applied to the dose shown in (A) yields a perfectly gelled slice of a thinker geometry. Panel (C) shows a tomosynthetic printing geometry, with projection direction vertically angled by 40° from the standard printing geometry. Panel (D) shows a slice of a 3D thinker-geometry dose-reconstruction with VER near zero (1.7E-4), made with the tomosynthesis writing geometry shown in (C), with Dl=0.74 and Dh=0.75. The process window size was −0.70%, and the IPDR was 0.26. Note that Panel (D) shows a 2D slice of a 3D reconstruction, not a 2D reconstruction. In this case, 360 angles, all at a 50° to the axis of rotation, were used.
Figure 8:
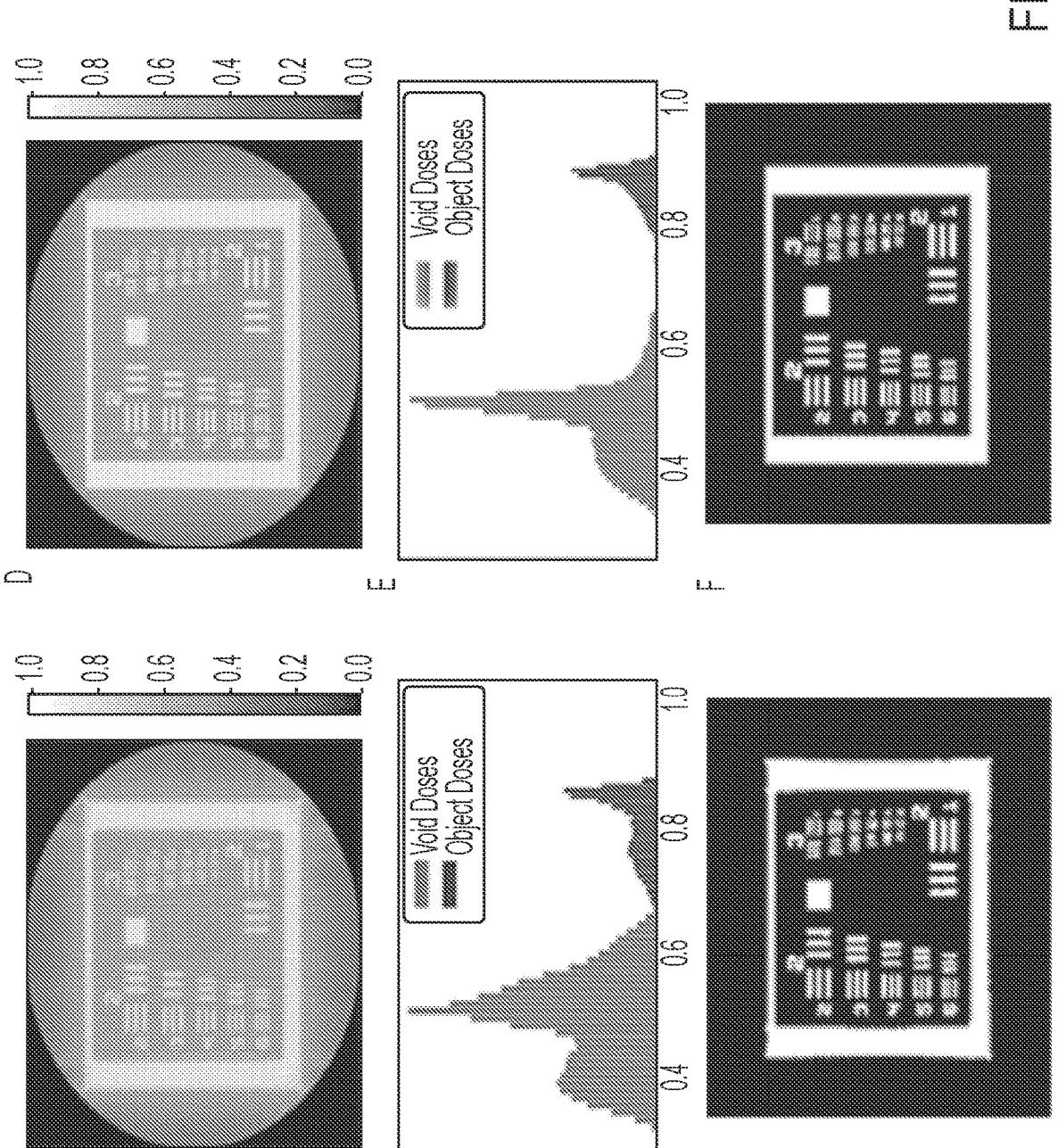
FIG. 8 depicts effects of including material inhibition when computing VAM image-sets. Panel (A) depicts a reconstruction of simulated conversion (units normalized to maximum conversion) made without inhibition, using a large separation of parameter values: $D_f$=0.5, and $D_h$=0.9. Panel (B) depicts the resultant dose-distributions. The histogram overlap yields a positive VER, with gelation-error pixels a consequence, as shown in Panel (C). Panel (D) depicts a reconstruction of simulated conversion (units normalized to maximum conversion) made with the same parameter values, but computed with the inclusion of material inhibition. Panel (E) depicts the resultant dose-histograms that do not overlap, and a high-contrast reconstruction with VER=0 has been achieved. Panel (F) depicts applying a gelation threshold results in the desired geometry. A high-contrast reconstruction such as this would be desirable for applications with large optical or material uncertainties or print-timing, or for applications where the initial-gelled part must be driven to higher degrees of material conversion before removal from remaining resin, and post-cure.
Figure 9:
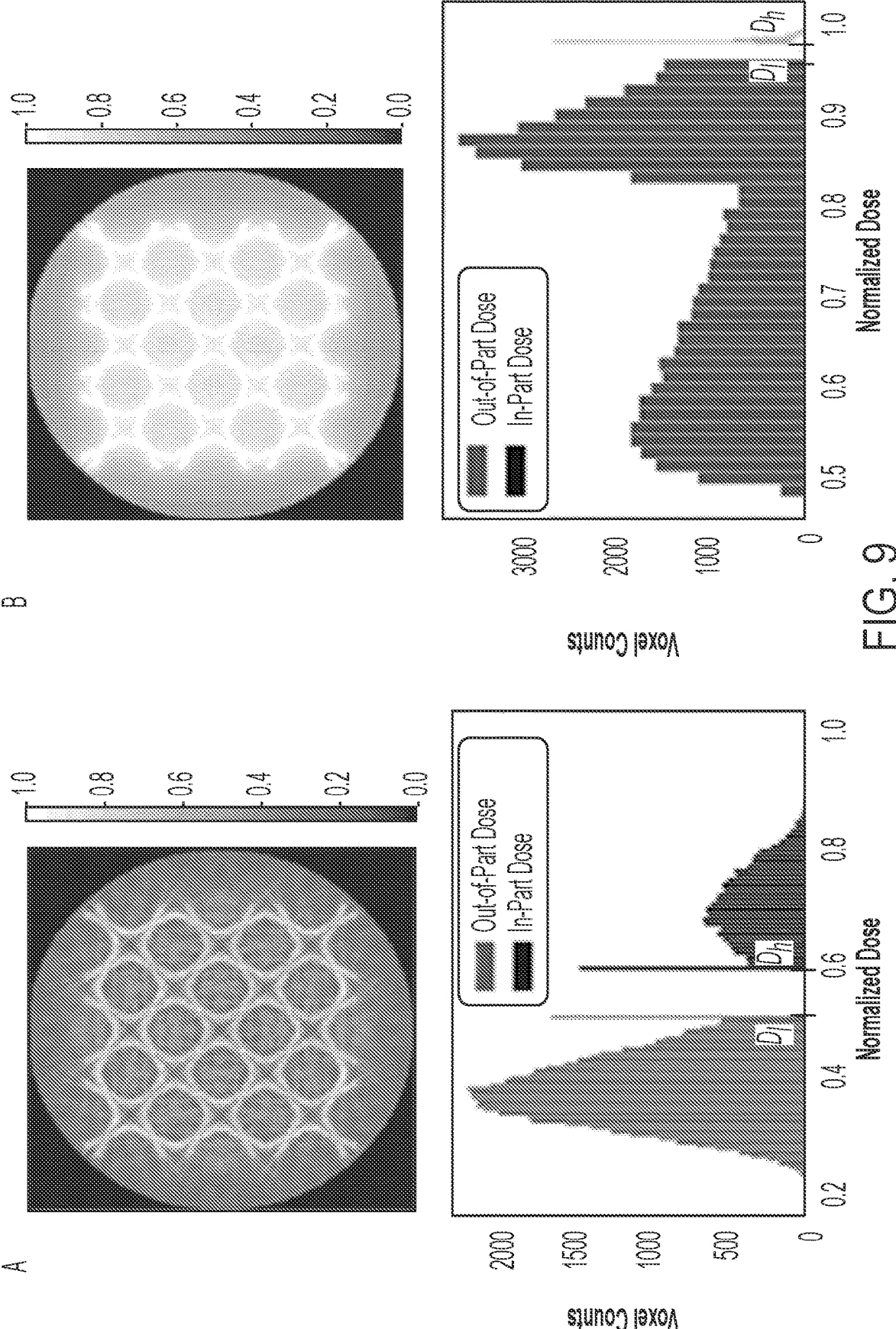
FIG. 9 depicts tradeoffs between process window size, and IPDR. Panel (A, Top) depicts Binary VAM reconstruction with $D_f$=0.51, and $D_h$=0.59. Panel (A, Bottom) depicts histograms of in-part and out-of-part dose. Panel (B, Top) depicts Binary VAM reconstruction with $D_f$=0.95, and $D_h$=0.98. Panel (B, Bottom) depicts histograms of in-part and out-of-part dose. Reconstruction-A has a process window over 3 times larger than that of Reconstruction-A, but an IPDR that is over 10 times larger. Note that choosing parameter values that try to simultaneously accomplish a small IPDR and a large process window (e.g. $D_f$=0.7, and $D_h$=0.98) may not work—trying to achieve such a reconstruction results in histogram overlap, and a non-zero VER.
Figure 10:
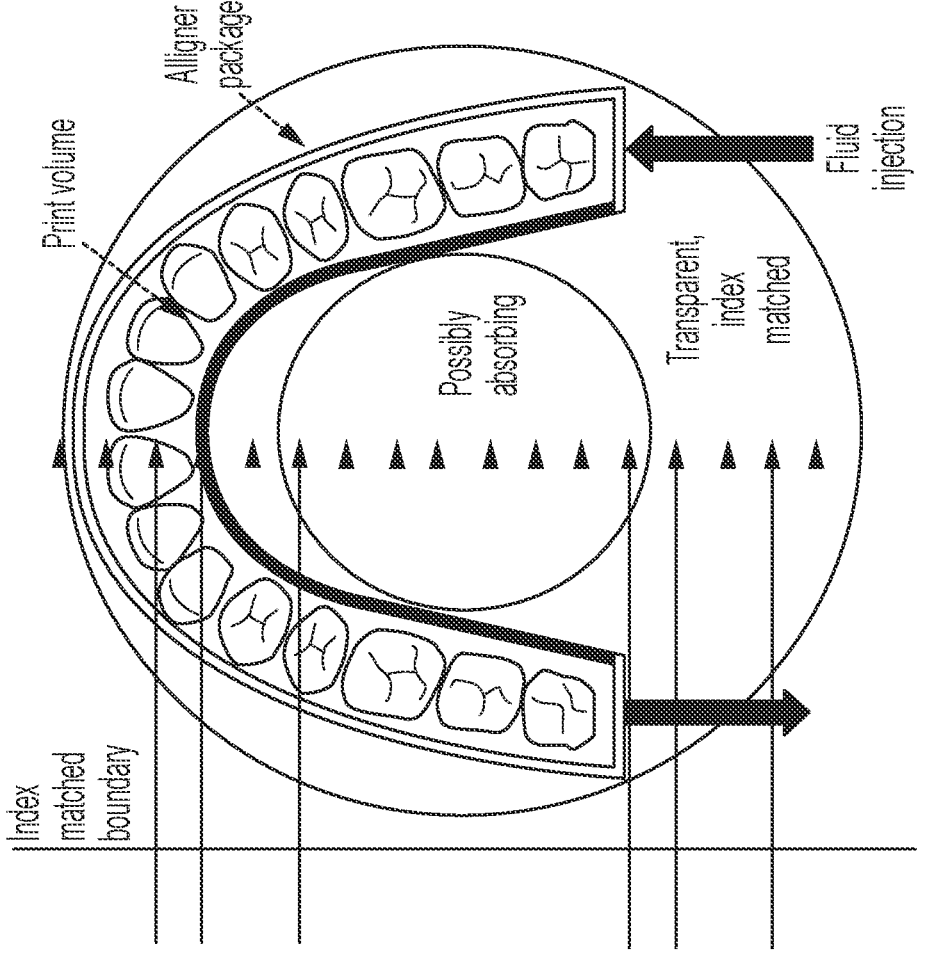
FIG. 10 depicts an example layout and process (left): A dental aligner (represented by the diagram of teeth) is printed into liquid resin contained in an aligner package by external projected light, shown here entering from the left. The package and resin are contained in a transparent, index matched environment such as an oil to enable undistorted optical access to the print volume. Portions of the volume or the package may have other optical properties such as absorption of the writing light to assist in the printing process.
Figure 10:
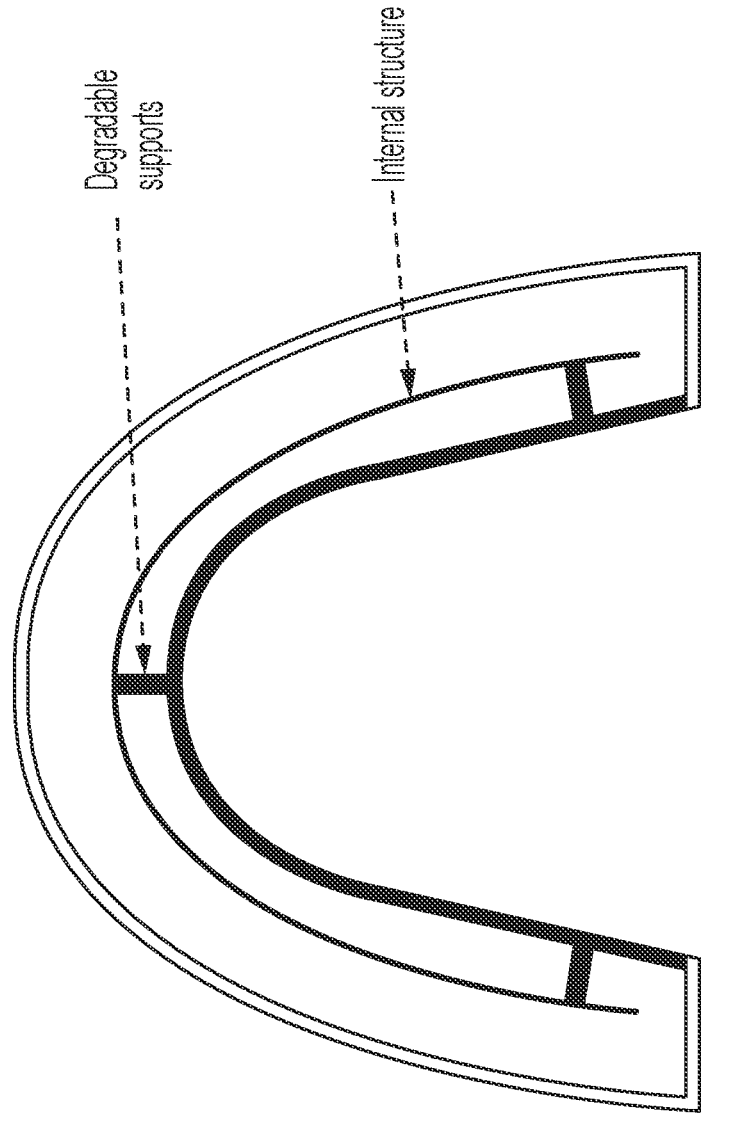

In prior VAM literature, only a basic tomographic projection geometry was considered: one in which writing beams are normal to the axis of rotation, and are evenly distributed about a rotation. Other printing geometries, however, are possible and may have application advantages. In particular, the standard geometry requires access to the sample from all directions normal to the rotation axis. One alternative is to use a limited angular range for printing. FIGS. 7A and 7B depict an example of a reconstruction slice of a thicker geometry. Here, an angular range of 130° was used, yet the binary VAM algorithm was able to produce a reconstruction with a VER of zero. Another geometry, inspired by tomosynthetic medical imaging, uses a ring of projections that are at a fixed, non-normal angle to the axis of rotation (see FIG. 7. C, D). This can allow for VAM printing into flat sample packages, for example with applications in microfluidics, organ-on-a-chip research, and so forth. Also in this case, the binary VAM algorithm achieved a VER of zero.

For both the limited angular range reconstruction, as well as the tomosynthesis reconstruction, while a VER of zero was achieved, the resultant process window sizes were smaller (nearly zero) than what a standard tomographic geometry could achieve. In both cases, this is due to a reduction in the degrees of freedom of the reconstruction process. For the limited angular range case, 130° (36%) of a full rotation was used. With tomosynthesis, the degrees of freedom of the reconstruction can be reduced because the volume can no longer be de-coupled into slices addressed by 1D projections, and there is an increased spatial overlap of writing beams. Small deviations from the standard geometry may not suffer a decrease in reconstruction performance, with larger deviations (the limit being 90 degrees for tomosynthesis) exhibiting worse reconstructions. However, image sets can be generated for complex, arbitrary target-objects by the binary VAM algorithm.

Tomosynthetic VAM printing, in particular, could enable new applications of VAM that do not map well onto the cylindrical resin geometry. The ability to print directly into flat samples through a flat optical window can lend itself to manufacturing for microfluidic and biomedical devices. Since the depth of focus of tomosynthetic VAM can be constrained to be similar to the thickness of the resin slab, parts that have one dimension significantly smaller than the others can be printed at significantly greater resolution than cylindrical VAM. And, unlike with the standard cylindrical VAM printing geometry, tomosynthetic VAM can allow for writing into very large slabs of resin one small, high-resolution area at a time.

VAM for Printing of Hybrid Parts in Package

To enable print-on-demand (e.g. in a clinic or at home), there is a need to minimize the amount of precursor materials and solvents used and handled by non-experts without access to chemical safety equipment such as a fume hood. Additionally, material properties of printed parts do not match all current needs, so hybrid and composite parts are desirable to extend print capability while retaining the advantages of customization and arbitrary geometry provided by additive manufacturing. An example of both is the printing of dental aligners e.g. in a medical office. Disclosed below is a process designed for that application that includes several disclosures.

Example Process #1

The process described herein can print a custom dental aligner in a transportable package, optionally including a non-printed structure that will modify the mechanical properties of the aligner.

Resin is injected into the aligner package. This could be done at the point of printing but is most advantageous to be done at a package manufacturing site and then shipped to the point of printing. In this way, the operator does not handle an open container of resin when preparing the print job. Additionally, as described below, this container may be maintained through the entire process, eventually forming all or part of the packaging delivered to the customer. This minimizes handling, contamination and package waste. The closed container may eliminate the need for sterilization of biomedical parts. This can be an advantage for polymers which cannot be subject to some sterilization processes such as the use of an autoclave.

Some portion of the package is optically transparent to some wavelength range to enable printing of the part inside the package using the volumetric printing techniques described in the present disclosure. In some cases, all or part of the package can be optically absorbing to some wavelengths to improve print quality, for cosmetic reasons or to protect the contained materials. In some cases, a portion of the package can be temporary, e.g. a cover that prevents illumination before or after printing. In some cases, the interior of the package can provide mechanical or chemical features to promote or suppress adhesion of the printed material to the package, depending on need.

In some cases, internal structure within the resin volume of the package may provide support for the printed part and or be incorporated into the printed part to modify mechanical properties of the final part. Supports can be provided that connect the printed part to the interior of the package to suppress settling or provide a precise location for the part during testing. In some cases, these supports can be degradable by later stimulus, e.g. mechanical, heat, light or pH. An example material that can be incorporated is a molded elastomer similar to current dental aligners that may contribute to the mechanical behavior of the final part. In some cases, a portion of the interior surface of the container may serve as a mold that provides the shape for the final printed part that is in contact with the container. The 3D printed portions of the final part can then provide the required customized mechanical features such as interface to the surfaces of the teeth.

In some cases, in preparation for printing, a cover or other protective portions of the package may be removed or added. Other pre-processing may occur e.g. to sensitize or homogenize the resin.

A portion of the liquid resin can solidify and harden by projecting patterned light through the exterior of the package into the photosensitive resin. The details of this exposure are described in the present disclosure.

A delay between exposure and post processing may be included to allow for dark polymerization and further hardening of the part. The temperature of the resin during and after printing can be prescribed to optimize properties such as development of crystallinity. The package can aid in this temperature control through passive thermal properties (e.g., thermal conductivity) or active control capability (e.g., incorporation of heaters and/or temperature measurement devices).

After exposure and printing, the resin that has not gelled can be removed. This can be done by immersion of the part into a solvent. Such solvents are often hazardous and environmentally damaging. Diffusion of unreacted monomer out of the printed part and/or swelling of the part by the solvent often occur during solvent soak, changing part dimensions and adding process time. It is thus advantageous to minimize the soak time, handling and quantity of such solvents.

The print-in-package approach described here allows pressurized injection of solvent into the package to remove liquid monomer. By flowing fresh, moving solvent into the package and solvent and resin out of the package, this minimizes the volume of solvent used and may minimize fumes or other hazards by keeping solvent enclosed. The small volume and rapid application of the solvent in a closed container enables the use of heated solvent which can help remove monomer, control crystallinity, and/or initiate further dark polymerization.

In some cases, motion of the solvent provides a mechanical cleaning action, further improving the efficiency and reducing the time required. Therefore, pressure and flow rate may be optimized for improved results. In some cases, additional mechanical stimulus can be applied to the package such as spinning or sonication to improve the process and/or decrease process time. Gravity may be used to assist the process, e.g. by draining unreacted monomer from the container. This can be assisted by centrifugation.

After removal of unreacted resin, further post processing may occur, e.g. to fully convert reactive groups in the remaining solid part. This can involve the use of heat or light. Further post-processing can include wet chemical processing such as a heated liquid, a catalyst or a polymerizable monomer. In some cases, a wash step can be included, e.g. by injection through the package, to sterilize the printed part.

During the print or after, metrology of the printed part can be performed. This metrology may occur with the part still in its package, maintaining the advantages of reduced handling and sterility. Such metrology can be used to validate that the print has met certain design goals or tolerances. Optical measurement techniques such as microscopy or tomography may be particularly appropriate given that the package has been designed to provide optical access for printing.

For purposes of process control and qualification of the printed part, the total volume of the printed part can be found by measuring the volume of a liquid drained from a full package. Total volume can be directly related to the precision of the gelation threshold of the monomer, one of the critical process parameters. That is, if chemical or optical tolerances cause the printing process to deliver more than the required dose, the part volume will increase which would reduce the open volume in the package by the same amount.

The finished part-in-package may be supplemented with covers, labels or other additions to meet cosmetic, transportation or stability requirements. The part can be delivered in the package or removed for delivery or further processing.

Because large index contrast between the package, resin and surrounding material will complicate optical printing and optical metrology, it may be desirable that these be approximately index matched. Many organic solvents have refractive indices near that of polymers (e.g. 1.45 to 1.55) and thus may satisfy this requirement. Inert oils with known refractive index may also be used for this purpose.

Optical metrology may be simplified by changing the liquid environment inside the package around the printed part. For example, a fluorescent or absorbing dye can provide optical contrast with the printed part, supporting a number of optical metrology methods.

This metrology can occur in the printing instrument or in a separate instrument. In the case of the former, the metrology can be used in a feedback loop to guide the printing process, either during printing or as a manufacturing control using post-print data. The print volume, for example the shaded central cylinder in FIG. 13, could include light sources or detectors that form a portion of this metrology system.

Metrology can be informed by a model of the material and print process and not simply be dimensional measurements. For example, measurements can establish variations in the exposure time required to gel the part which may vary due to chemical composition of the resin, temperature or variable optical power.

The process described herein can be extended to print multiple parts simultaneously, e.g. by stacking the packages shown in the figure in a line out of the page.

Example Process #2

A related concept is to print into a "package" which is fully or partially incorporated as part of the printed part itself. In the case of a dental aligner, this package can use materials similar to current molded aligners formed into a "U" shape that surrounds but does reach the positions of the teeth that will later be positioned inside the U. The interior space of the "U" can be filled with resin, illustrated in FIG. 14. The top of the "U" can be closed, ideally with some material such as PDMS that is flexible (to seal liquids inside) and can suppress radical polymerization at its surface (to insure no adhesion of the printed part). This removable portion of the monomer container can be colored, e.g. with an optical absorber, to assist in stray light control. The processes described above can be applied to print mechanical interfaces between the molded portion of the aligner and the teeth, providing the needed customization for a particular patient. These mechanical interfaces can connect the teeth to the molded aligner, avoiding much of the need for the printed material to provide the mechanical functions of the aligner.

The interior of the molded part may provide chemical (e.g. acrylate functionality) or mechanical features (e.g. porosity or roughness) to promote the adhesion of the printed material. Conversely, the exterior of the molded part may be specialized for durability, stain resistance or cosmetic appearance.

The molded part can in some cases be at least partially transparent to enable writing and metrology light to access the interior. Conveniently, dental aligners are transparent for cosmetic reasons. Alternately, the tomosynthetic printing method disclosed above can be used to print into the "U" from its open top.

If the printed resin is degradable the molded portion can be reused. Potential degradation stimuli include pH beyond that typical of the mouth, heat and/or UV light.

ENUMERATED EMBODIMENTS

The following enumerated embodiments are provided, the numbering of which is not to be construed as designating levels of importance:

Embodiment 1 provides a method for generating images for use in volume additive manufacturing (VAM), the method comprising:

a) selecting, as an initial model, a target distribution of gelation in a volume of photosensitive composition;

b) forward projecting the initial model by:

generating a set of images at varying angles and positions with respect to the volume of photosensitive composition: and converting the generated set of images to a target distribution intensity model:

c) backward projecting the target distribution intensity model by:

generating an optical dose reconstruction; and comparing the optical dose reconstruction and the target distribution of gelation for modifying the model or to dose-threshold values.

Embodiment 2 provides the method of embodiment 1, wherein step c) further comprises:

determining locations within the volume of photosensitive composition apart from the target distribution of gelation receiving an optical dose above a predetermined dosage threshold.

Embodiment 3 provides the method of any one of embodiments 1-2, wherein step c) further comprises:

removing the optical dose above the predetermined dosage threshold from the volume of photosensitive composition apart from the target distribution of gelation.

Embodiment 4 provides the method of any one of embodiments 1-3, further comprising:

d) calculating a removed optical dosage removed from the target distribution of gelation during the step c); and e) adding the calculated removed optical dosage to the target distribution of gelation within of the initial model.

Embodiment 5 provides the method of any one of embodiments 1-4, further comprising:

f) iteratively repeating steps b) and c) for the initial model or a subsequently generated model that is generated by performing the steps a)-e).

Embodiment 6 provides the method of any one of embodiments 1-5, wherein converting the generated set of images comprises:

determining a set of negative image values within the generated set of images; and i) setting each of the set of negative image values to a zero image value: or ii) assigning a constant negative value to the negative values, wherein the magnitude of the constant negative value depends on the amount of radical inhibitors in the photosensitive resin, and adding the absolute value of the constant negative value to the target distribution intensity model.

Embodiment 7 provides the method of any one of embodiments 1-6, wherein the model for optical projection comprises a plurality of voxels representing a digitized version of an object to be printed.

Embodiment 8 provides the method of any one of embodiments 1-7, further comprising:

selecting, for inclusion of the initial model, a set of property parameters for the target distribution of gelation in the volume of photosensitive composition prior to step b).

Embodiment 9 provides the method of any one of embodiments 1-8, wherein step c) further comprises determining optical projection ray trajectories for an optical projector.

Embodiment 10 provides the method of any one of embodiments 1-9, wherein selecting the initial model further comprises determining an occlusion object within the volume of the photosensitive composition.

Embodiment 11 provides a method of 3-D printing comprising:

providing a volume of a photosensitive composition having an axis of rotation and an angular motion relative to at least one light projector;

optically projecting light onto a flat surface of the volume, wherein the flat surface is orthogonal to the axis of rotation; and printing an object from the volume of photosensitive composition based on the optical projections.

Embodiment 12 provides the method of embodiment 11, wherein the optical projection is generated using the method of claim 1.

Embodiment 13 provides the method of any one of embodiments 11-12, wherein the light is optically projected at an incident angle relative to the flat surface of 1 to 89 degrees.

Embodiment 14 provides the method of any one of embodiments 11-13, wherein the printed object comprises a functionally graded material.

Embodiment 15 provides the method of any one of embodiments 11-14, wherein the printed object comprises a dental aligner.

Embodiment 16 provides the method of any one of embodiments 11-15, further comprising:

injecting the volume of photosensitive composition into a printing mold prior to the projecting.

Embodiment 17 provides the method of any one of embodiments 11-16, further removing at least a portion of the photosensitive composition that remains uncured subsequent to the printing.

Embodiment 18 provides the method of any one of embodiments 11-17, further comprising:

conducting an optical metrology process for the printed object, via a microscopy instrument, a tomography instrument, or a combination thereof.

Embodiment 19 provides the method of any one of embodiments 11-18, wherein the optical metrology process can be performed during the printing process.

Embodiment 20 provides the method of any one of embodiments 11-19, further comprising:

contacting a fluorescent or absorbing dye with the volume of photosensitive composition prior to the optical metrology process.

Embodiment 21 provides the method of any one of embodiments 11-20, wherein the conducting comprises optical metrology of birefringence of the part during or after the printing.

Embodiment 22 provides a printing assembly for volume additive manufacturing (VAM) printing comprising:

an exterior shell defining a cavity;

a volume of a photosensitive composition having at least one flat surface and contained within the cavity;

at least one light projector configured to project light onto the flat surface of the volume;

a means for generating relative angular motion between the volume and the light projector; and wherein the volume has an axis of rotation and the flat surface is orthogonal to the axis of rotation.

Embodiment 23 provides the printing assembly of embodiment 22, wherein a temperature of the exterior shell is controlled during a photocuring process, after the photocuring process, or both.

Embodiment 24 provides the printing assembly of any one of embodiments 22-23, wherein at least a portion of the exterior shell is composed of an optically transparent material within a defined wavelength range.

Embodiment 25 provides the printing assembly of any one of embodiments 22-24, wherein at least a portion of the exterior shell is composed of an optically absorbing material within a defined wavelength range.

Embodiment 26 provides the printing assembly of any one of embodiments 22-25, further comprising a cover portion configured to be removed from an exterior surface of the exterior shell, wherein the cover portion is composed of a light-shielding material capable of blocking light transmission within a range of wavelengths.

Embodiment 27 provides the printing assembly of any one of embodiments 22-26, wherein an interior surface of the exterior shell is composed of, or is in contact with, an adhesion suppression material or an adhesion promotion material.

Embodiment 28 provides the printing assembly of any one of embodiments 22-27, further comprising:

a physical structure contained within the cavity adapted or configured to support a printed object printed from the photosensitive composition.

Embodiment 29 provides the printing assembly of any one of embodiments 22-28, wherein the physical structure includes a proximal end and a distal end, wherein the proximal end is in contact with an interior surface of the exterior shell, and the distal end is configured or adapted to be in contact with the printed object once printed.

Embodiment 30 provides the printing assembly of any one of embodiments 22-29, wherein the physical structure is further adapted or configured to be degradable based on exposure to a heat stimuli, a mechanical stimuli, a light stimuli, a pH stimuli, or a combination thereof.

Embodiment 31 provides the printing assembly of any one of embodiments 22-30, wherein the printed object comprises a dental aligner.

Embodiment 32 provides the printing assembly of any one of embodiments 22-31, wherein a portion of the volume of photosensitive composition that remains unreacted after printing is configured to be removed via solvent over or through the photosensitive composition.

Embodiment 33 provides the printing assembly of any one of embodiments 22-32, wherein the exterior shell further defines one or more apertures configured or adapted to transfer a volume of solvent, the volume of photosensitive composition, a chemical species for initiating a chemical reaction, a volume of another photosensitive composition, or a combination thereof, within the cavity.

Embodiment 34 provides the printing assembly of any one of embodiments 22-33, wherein the exterior shell forms a U-shape.

Embodiment 35 provided method of 3-D printing comprising:

providing a volume of a photosensitive composition having an axis of rotation and an angular motion relative to at least one light projector;

optically projecting light onto a non-flat surface of the volume at an incident angle of 1 to 89 degrees relative to the non-flat surface, wherein the non-flat surface of the volume is not orthogonal to the axis of rotation; and printing an object from the volume of photosensitive composition based on the optical projections.

Embodiment 36 provides the method of embodiment 35, wherein the optical projection is generated using the method of claim 1.

Embodiment 37 provides the method of any one of embodiments 35-36, wherein the non-flat surface is parallel to the axis of rotation.

Embodiment 38 provides the method of any one of embodiments 35-37, wherein the printed object comprises a functionally graded material.

Embodiment 39 provides the method of any one of embodiments 35-38, wherein the printed object comprises a dental aligner.

Embodiment 40 provides the method of any one of embodiments 35-39, further comprising:

injecting the volume of photosensitive composition into a printing mold prior to the projecting.

Embodiment 41 provides the method of any one of embodiments 35-40, further comprising:

removing at least a portion of the photosensitive composition that remains uncured subsequent to the printing.

Embodiment 42 provides the method of any one of embodiments 35-41, further comprising:

conducting an optical metrology process for the printed object, via a microscopy instrument, a tomography instrument, or a combination thereof.

Embodiment 43 provides the method of any one of embodiments 35-42, wherein the optical metrology process can be performed during the printing process.

Embodiment 44 provides the method of any one of embodiments 35-43, further comprising:

contacting a fluorescent or absorbing dye with the volume of photosensitive composition prior to the optical metrology process.

Embodiment 45 provides the method of any one of embodiments 35-44, wherein the conducting comprises optical metrology of birefringence of the part during or after the printing.

Embodiment 46 provides a printing assembly for volume additive manufacturing (VAM) printing comprising:

an exterior shell defining a cavity;

a volume of a photosensitive composition having at least one non-flat surface and contained within the cavity;

at least one light projector configured to project light onto the non-flat surface of the volume at an incident angle of 1 to 89 degrees relative to the non-flat surface;

a means for generating relative angular motion between the volume and the light projector; and wherein the volume has an axis of rotation and the non-flat surface is not orthogonal to the axis of rotation.

Embodiment 47 provides the printing assembly of embodiment 46, wherein the non-flat surface is parallel to the axis of rotation.

Embodiment 48 provides the printing assembly of any one of embodiments 46-47, wherein a temperature of the exterior shell is controlled during a photocuring process, after the photocuring process, or both.

Embodiment 49 provides the printing assembly of any one of embodiments 46-48, wherein at least a portion of the exterior shell is composed of an optically transparent material within a defined wavelength range.

Embodiment 50 provides the printing assembly of any one of embodiments 46-49, wherein at least a portion of the exterior shell is composed of an optically absorbing material within a defined wavelength range.

Embodiment 51 provides the printing assembly of any one of embodiments 46-50, further comprising a cover portion configured to be removed from an exterior surface of the exterior shell, wherein the cover portion is composed of a light-shielding material capable of blocking light transmission within a range of wavelengths.

Embodiment 52 provides the printing assembly of any one of embodiments 46-51, wherein an interior surface of the exterior shell is composed of, or is in contact with, an adhesion suppression material or an adhesion promotion material.

Embodiment 53 provides the printing assembly of any one of embodiments 46-52, further comprising:

a physical structure contained within the cavity adapted or configured to support a printed object printed from the photosensitive composition.

Embodiment 54 provides the printing assembly of any one of embodiments 46-53, wherein the physical structure includes a proximal end and a distal end, wherein the proximal end is in contact with an interior surface of the exterior shell, and the distal end is configured or adapted to be in contact with the printed object once printed.

Embodiment 55 provides the printing assembly of any one of embodiments 46-54, wherein the physical structure is further adapted or configured to be degradable based on exposure to a heat stimuli, a mechanical stimuli, a light stimuli, a pH stimuli, or a combination thereof.

Embodiment 56 provides the printing assembly of any one of embodiments 46-55, wherein the printed object comprises a dental aligner.

Embodiment 57 provides the printing assembly of any one of embodiments 46-56, wherein a portion of the volume of photosensitive composition that remains unreacted after printing is configured to be removed via solvent over or through the photosensitive composition.

Embodiment 58 provides the printing assembly of any one of embodiments 46-57, wherein the exterior shell further defines one or more apertures configured or adapted to transfer a volume of solvent, the volume of photosensitive composition, a chemical species for initiating a chemical reaction, a volume of another photosensitive composition, or a combination thereof, within the cavity.

Embodiment 59 provides the printing assembly of any one of embodiments 46-58, wherein the exterior shell forms a U-shape.

EQUIVALENTS

Although preferred embodiments of the disclosure have been described using specific terms, such description is for illustrative purposes only, and it is to be understood that changes and variations may be made without departing from the spirit or scope of the following claims.

INCORPORATION BY REFERENCE

The entire contents of all patents, published patent applications, and other references cited herein are hereby expressly incorporated herein in their entireties by reference.

What is claimed is:

1. A method for generating images for use in volumetric additive manufacturing (VAM), the method comprising: a) selecting, as an initial model, a target distribution of gelation in a volume of photosensitive composition; b) forward projecting the initial model by: generating a set of images at varying angles and positions with respect to the volume of the photosensitive composition; and converting the generated set of images to a target distribution intensity model; c) backward projecting the target distribution intensity model by: generating an optical dose reconstruction; and comparing the optical dose reconstruction and the target distribution of the gelation for modifying the model or to dose-threshold values.

2. The method of claim 1, wherein step c) further comprises: determining locations within the volume of the photosensitive composition apart from the target distribution of the gelation receiving an optical dose above a predetermined dosage threshold.

3. The method of claim 2, wherein step c) further comprises: removing the optical dose above the predetermined dosage threshold from the volume of photosensitive composition apart from the target distribution of gelation.

4. The method of claim 1, further comprising: d) calculating a removed optical dosage removed from the target distribution of the gelation during the step c); and e) adding the calculated removed optical dosage to the target distribution of the gelation within of the initial model.

5. The method of claim 4, further comprising: f) iteratively repeating steps b) and c) for the initial model or a subsequently generated model that is generated by performing the steps a)-e).

6. The method of claim 1, wherein converting the generated set of images comprises: determining a set of negative image values within the generated set of images; and i) setting each of the set of negative image values to a zero image value; or ii) assigning a constant negative value to the negative values, wherein a magnitude of the constant negative value depends on an amount of radical inhibitors in the photosensitive composition, and adding an absolute value of the constant negative value to the target distribution intensity model.

7. The method of claim 1, wherein the model for optical projection comprises a plurality of voxels representing a digitized version of an object to be printed.

8. The method of claim 1, further comprising: selecting, for inclusion of the initial model, a set of property parameters for the target distribution of the gelation in the volume of the photosensitive composition prior to step b).

9. The method of claim 1, wherein step c) further comprises determining optical projection ray trajectories for an optical projector.

10. The method of claim 1, wherein selecting the initial model further comprises determining an occlusion object within the volume of the photosensitive composition.

* * * * *